(12) United States Patent
Nakamura et al.

(10) Patent No.: US 10,670,829 B2
(45) Date of Patent: Jun. 2, 2020

(54) IMAGING DEVICE

(71) Applicant: Hitachi, Ltd., Chiyoda-ku, Tokyo (JP)

(72) Inventors: Yusuke Nakamura, Tokyo (JP);
Takeshi Shimano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/070,355

(22) PCT Filed: Mar. 2, 2016

(86) PCT No.: PCT/JP2016/056323
§ 371 (c)(1),
(2) Date: Jul. 16, 2018

(87) PCT Pub. No.: WO2017/149687
PCT Pub. Date: Sep. 8, 2017

(65) Prior Publication Data
US 2019/0339485 A1 Nov. 7, 2019

(51) Int. Cl.
*G02B 7/34* (2006.01)
*H04N 5/232* (2006.01)
(Continued)

(52) U.S. Cl.
CPC .............. *G02B 7/34* (2013.01); *G02B 26/02* (2013.01); *H04N 5/23229* (2013.01);
(Continued)

(58) Field of Classification Search
CPC .............. H04N 13/0239; H04N 5/232; G02B 27/1006; G02B 5/18–1895; G02B 27/4205; G02B 5/1823; G02B 7/34
(Continued)

(56) References Cited

U.S. PATENT DOCUMENTS

2004/0036838 A1* 2/2004 Podoleanu ............. A61B 3/102
351/206
2009/0057536 A1* 3/2009 Hirose ....................... G01J 1/04
250/208.1
(Continued)

FOREIGN PATENT DOCUMENTS

CN 101253425 A 8/2008
CN 101443689 A 5/2009
(Continued)

OTHER PUBLICATIONS

English translation of document C2 (Japanese-language Written Opinion (PCT/ISA/237) previously filed Jul. 16, 2018) issued in PCT Application No. PCT/JP2016/056323 dated Jun. 7, 2016 (six (6) pages).
(Continued)

*Primary Examiner* — Xi Wang
(74) *Attorney, Agent, or Firm* — Crowell & Moring LLP

(57) ABSTRACT

To obtain an imaging device capable of achieving high functionality of the imaging device by facilitating detection of an incident angle of light transmitted through a grating substrate. There is provided an imaging device which includes an image sensor that converts an optical image captured by a plurality of pixels arranged in an array on an imaging surface into an image signal and outputs the image signal, a modulator that is provided on a light receiving surface of the image sensor and modulates light intensity, an image storing unit that temporarily stores the image signal output from the image sensor, and a signal processing unit that performs image processing of the image signal output from the image storing unit, and in which the modulator has a first grating pattern composed of a plurality of concentric circles, and the signal processing unit modulates the image signal output from the image storing unit with a virtual second grating pattern composed of a plurality of concentric
(Continued)

circles so as to generate a moiré fringe image and changes a size of the concentric circle of the second grating pattern according to a focus position.

13 Claims, 22 Drawing Sheets

(51) Int. Cl.
  *G06T 5/10* (2006.01)
  *G02B 26/02* (2006.01)
(52) U.S. Cl.
  CPC . *H04N 5/232121* (2018.08); *H04N 5/232123* (2018.08); *G06T 5/10* (2013.01); *G06T 2207/20056* (2013.01)
(58) Field of Classification Search
  USPC .................. 348/46; 359/566–576, 305
  See application file for complete search history.

(56) References Cited

U.S. PATENT DOCUMENTS

| | | |
|---|---|---|
| 2009/0225215 A1 | 9/2009 | Korenaga et al. |
| 2010/0134888 A1 | 6/2010 | Korenaga et al. |
| 2014/0111620 A1* | 4/2014 | Park .................... G02B 27/1006 348/46 |
| 2014/0253781 A1 | 9/2014 | Gill et al. |
| 2015/0219808 A1 | 8/2015 | Gill et al. |
| 2018/0136480 A1* | 5/2018 | Shimano .............. G02B 5/1823 |

FOREIGN PATENT DOCUMENTS

| | | |
|---|---|---|
| CN | 104006765 A | 8/2014 |
| JP | 2012-145555 A | 8/2012 |
| JP | 2015-115527 A | 6/2015 |
| WO | WO-2016203573 A1 * | 12/2016 ........... G02B 5/1823 |

OTHER PUBLICATIONS

International Search Report (PCT/ISA/210) issued in PCT Application No. PCT/JP2016/056323 dated Jun. 7, 2016 with English-language translation (Four (4) pages).
Japanese-language Written Opinion (PCT/ISA/237) issued in PCT Application No. PCT/JP2016/056323 dated Jun. 7, 2016 (Five (5) pages).
Chinese-language Office Action issued in counterpart Chinese Application No. 201680070424.2 dated Dec. 10, 2019 (seven (7) pages).

* cited by examiner

[Fig. 1]
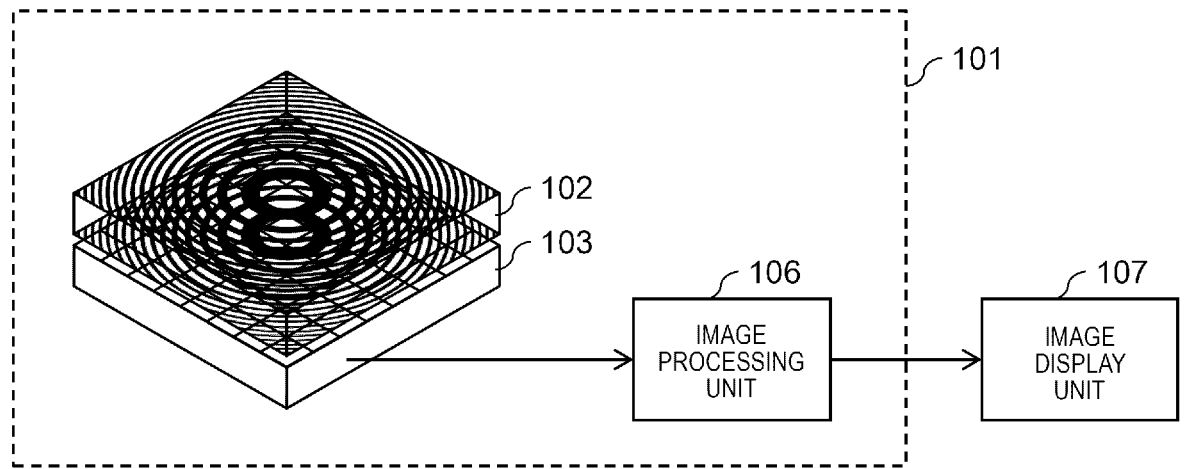
[Fig. 2]
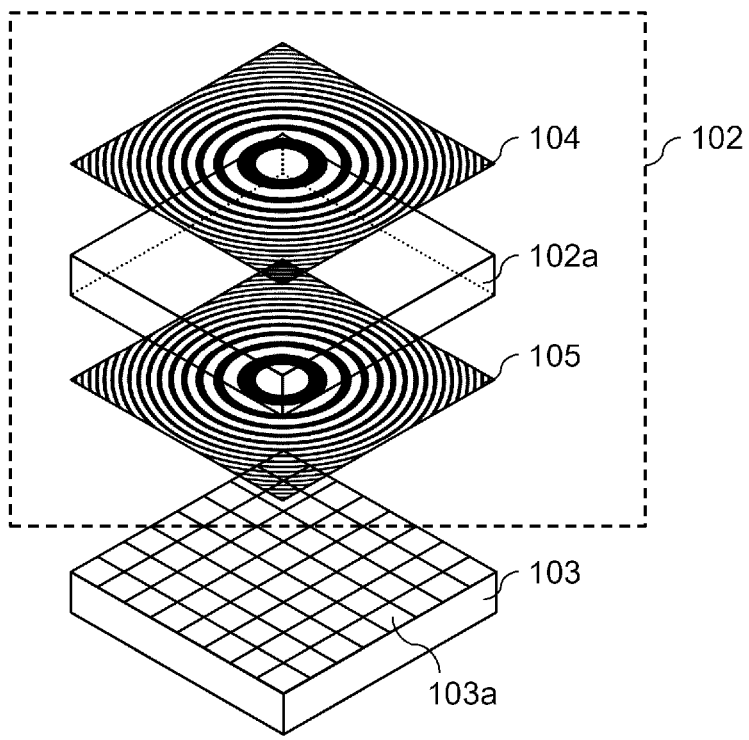

[Fig. 3]
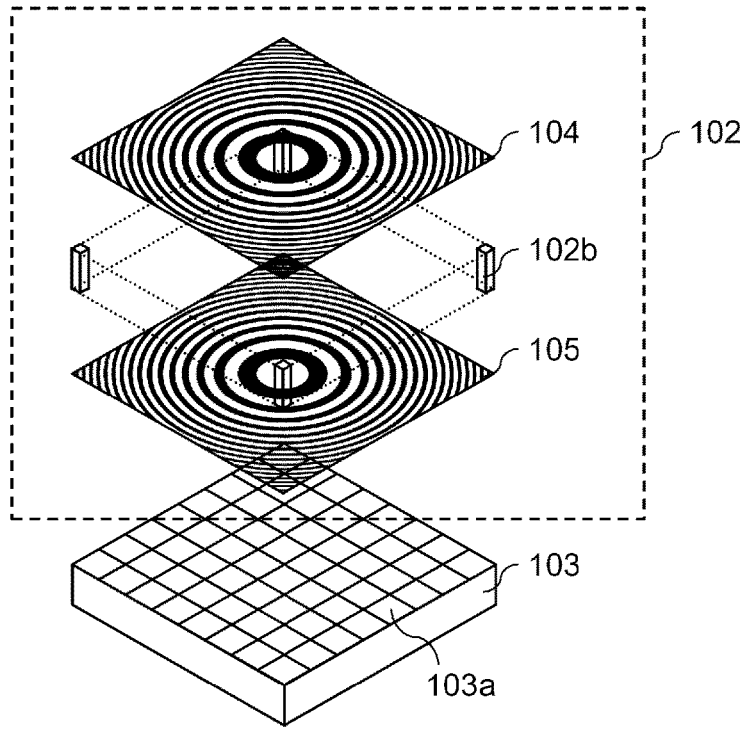
[Fig. 4]
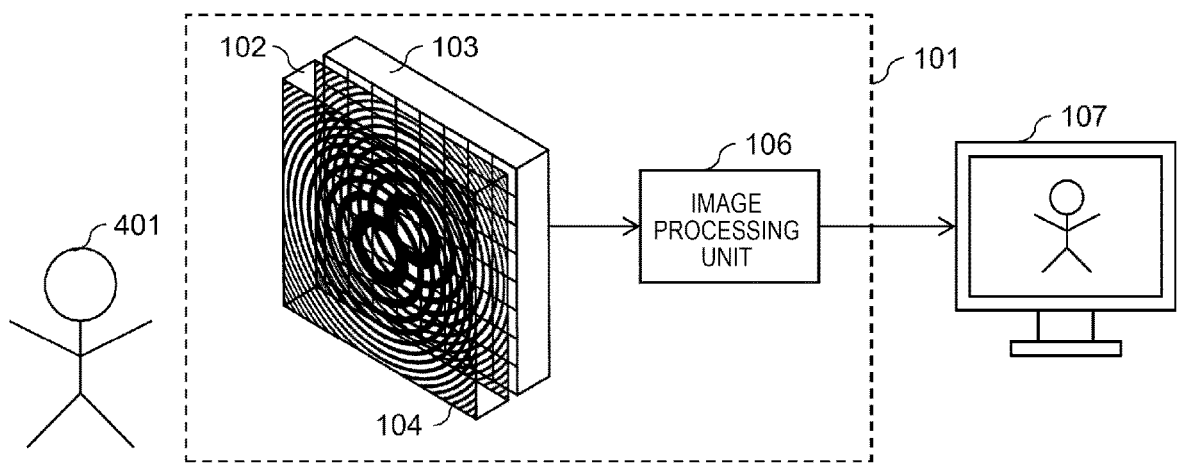

[Fig. 5]
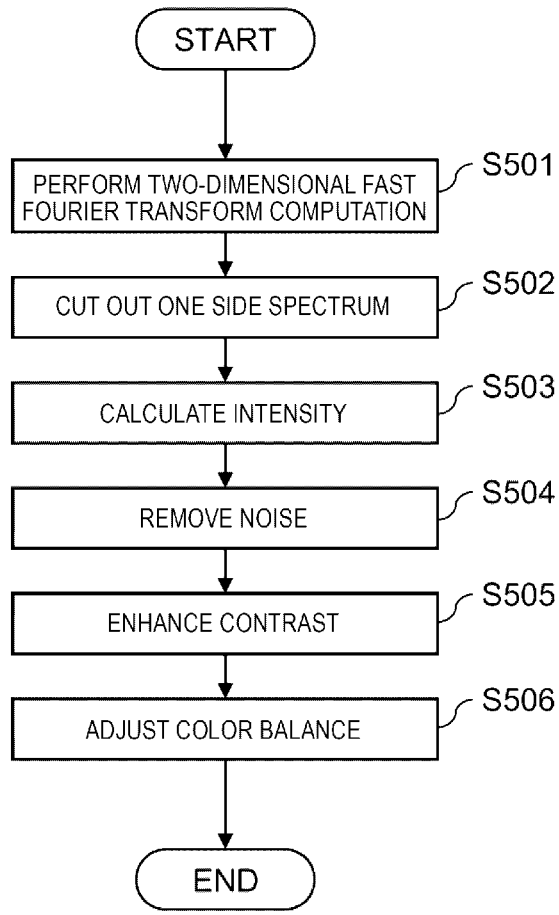
[Fig. 6]
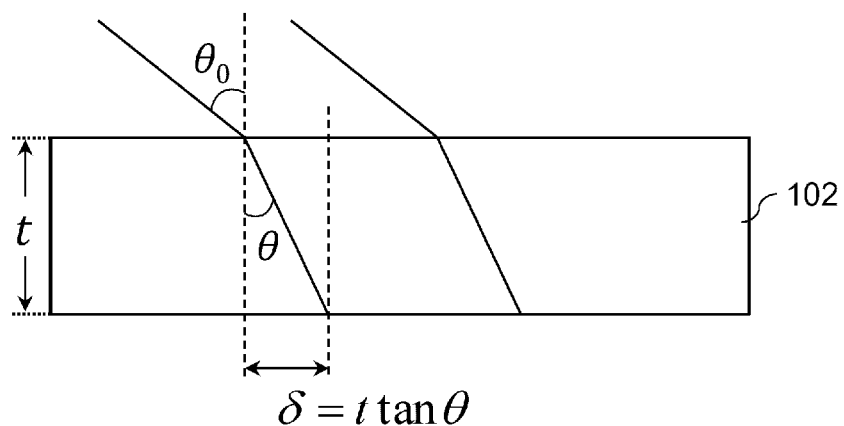

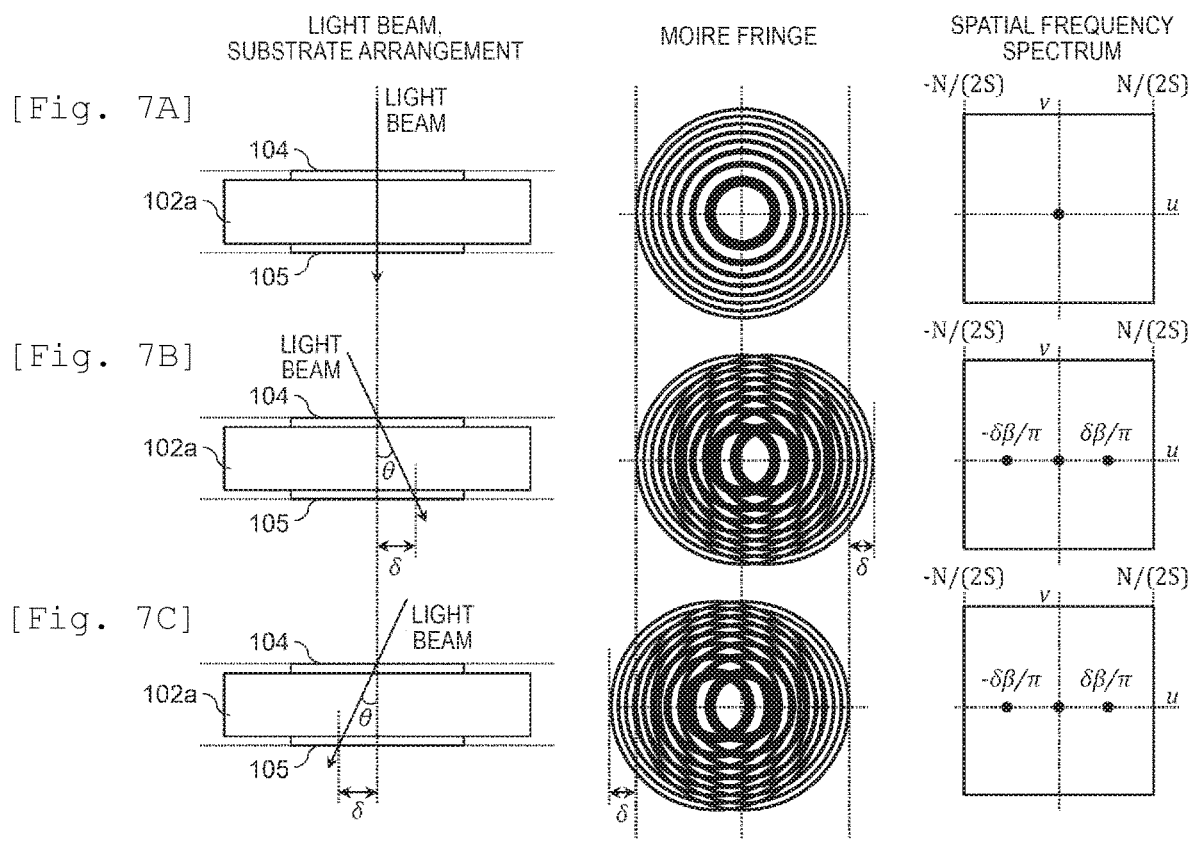
[Fig. 8]
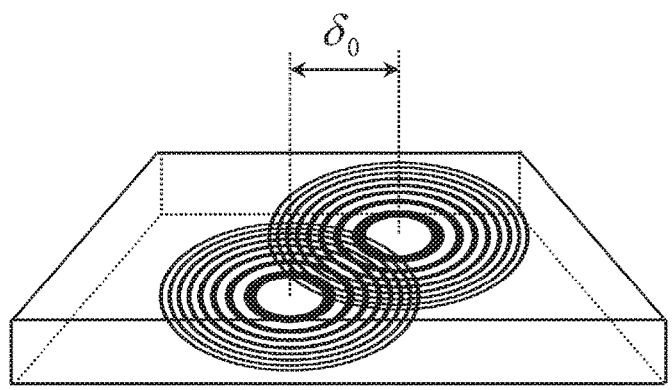

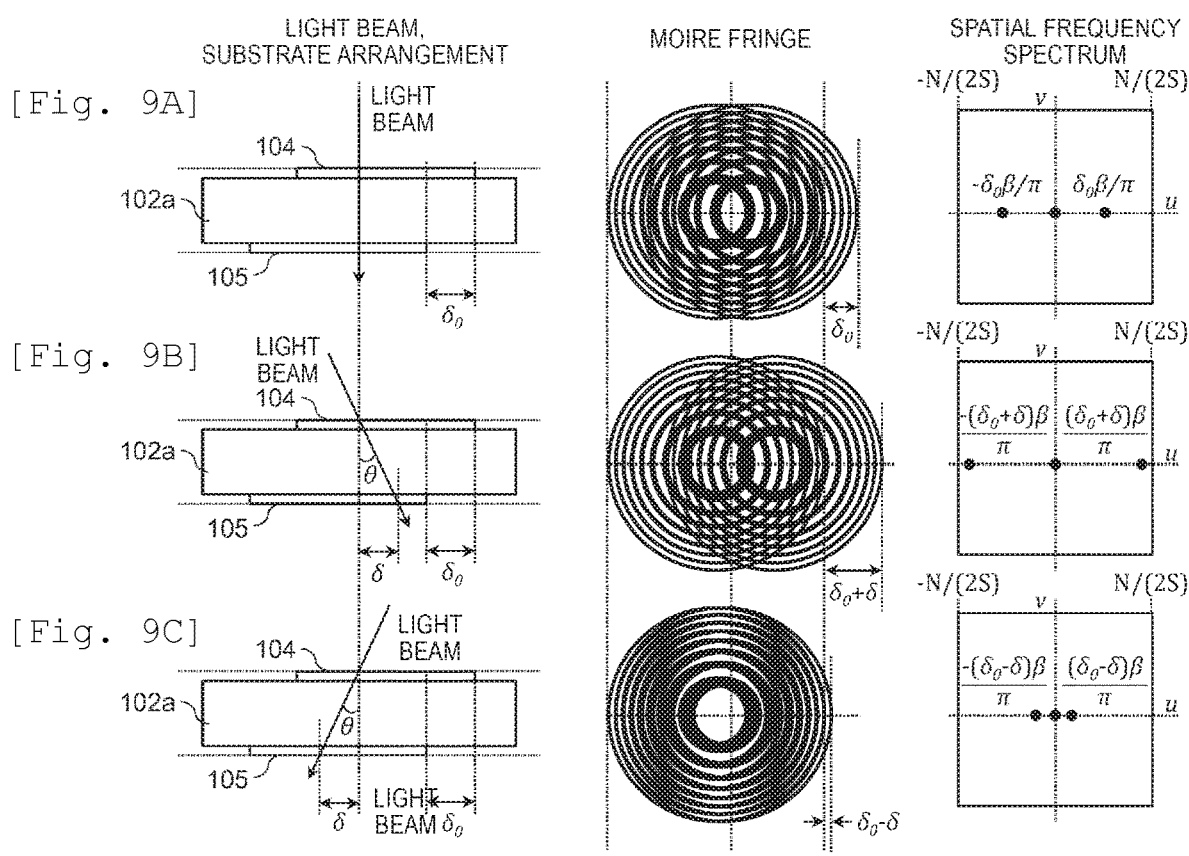

[Fig. 10]
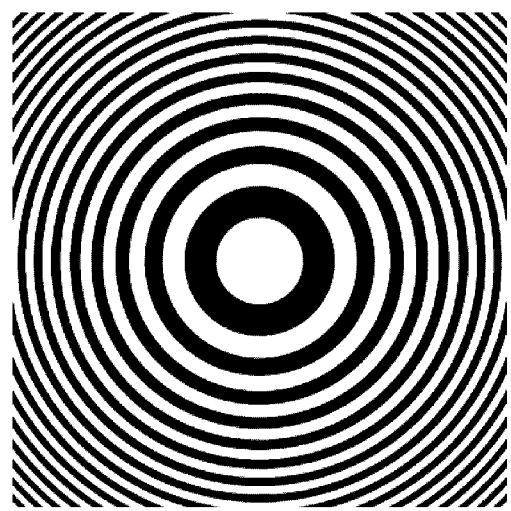
[Fig. 11]
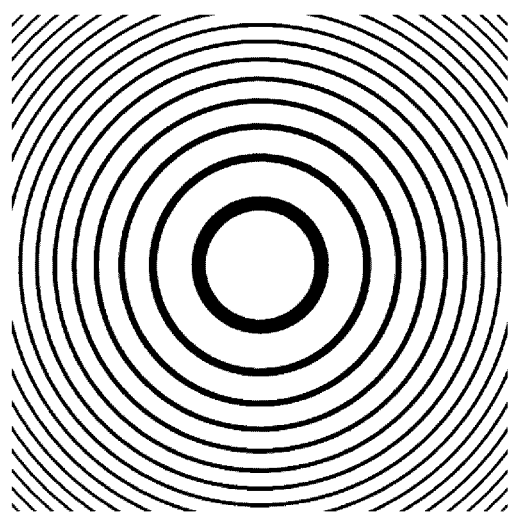

[Fig. 12]
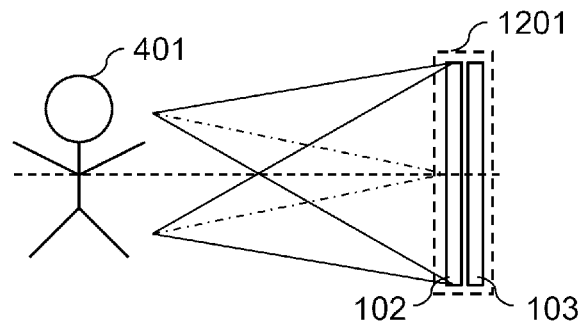
[Fig. 13]
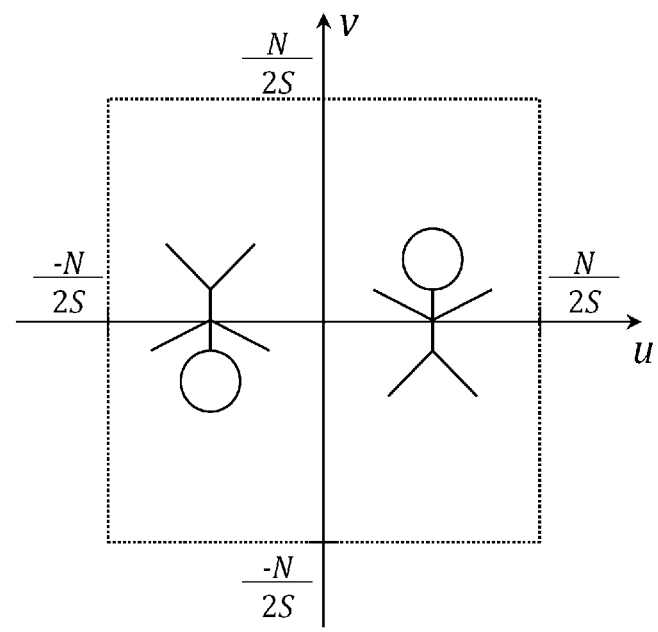

[Fig. 14]
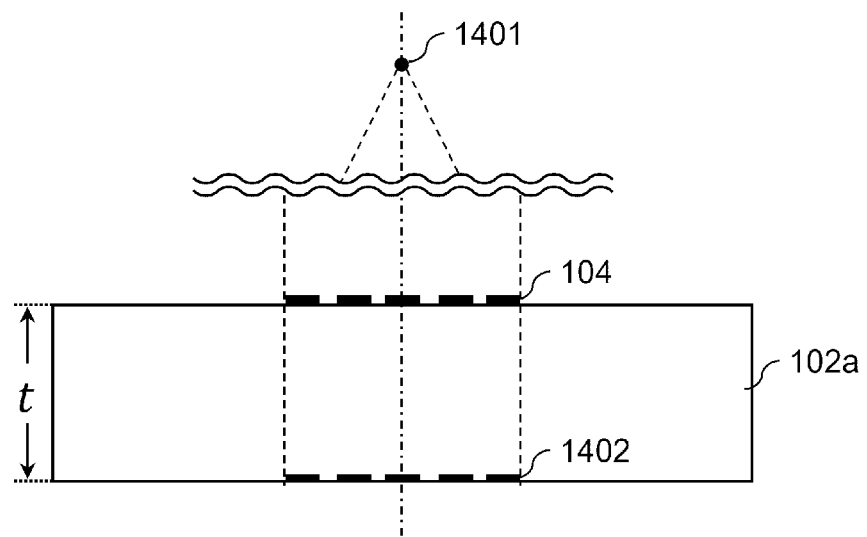
[Fig. 15]
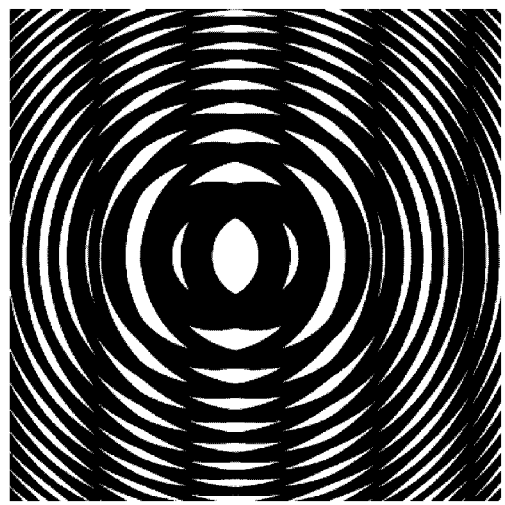

[Fig. 16]
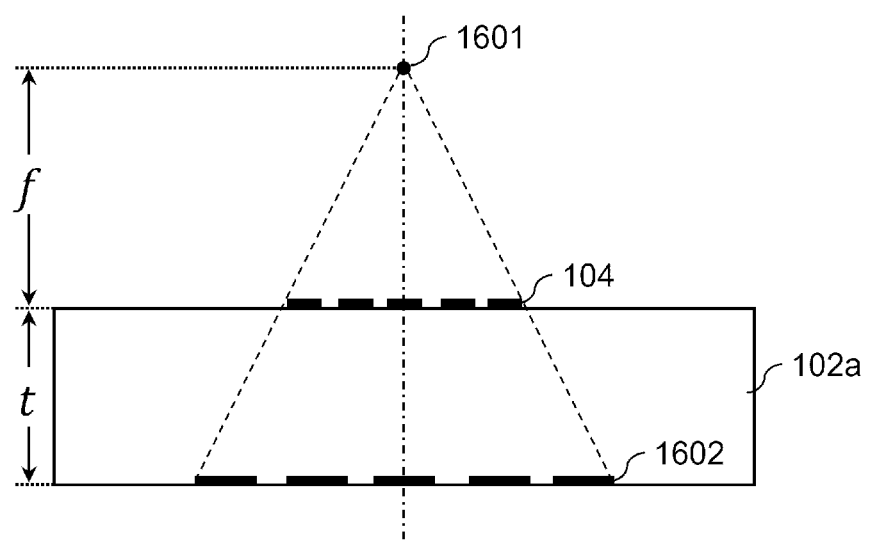

[Fig. 17]
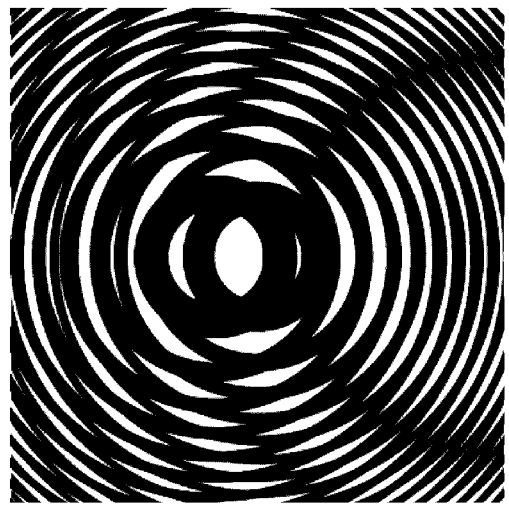
[Fig. 18]
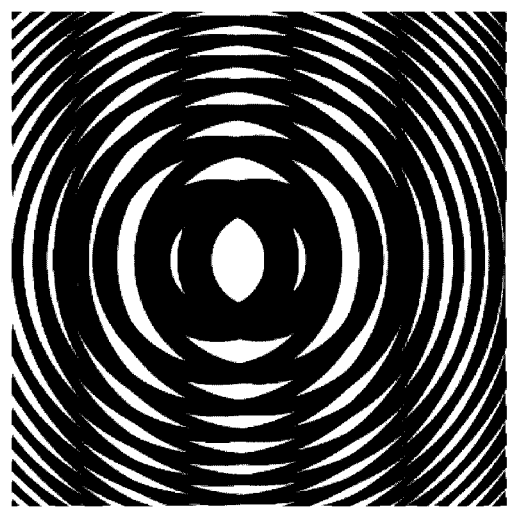

[Fig. 19]
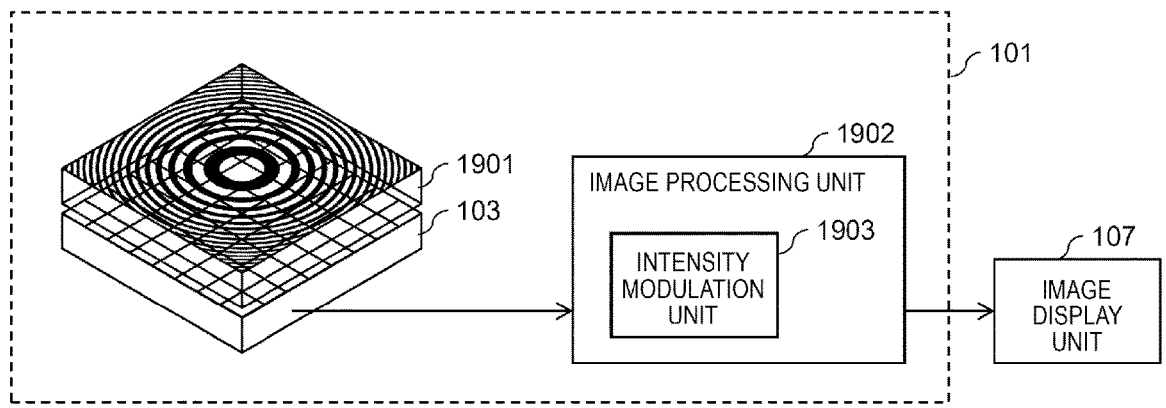
[Fig. 20]
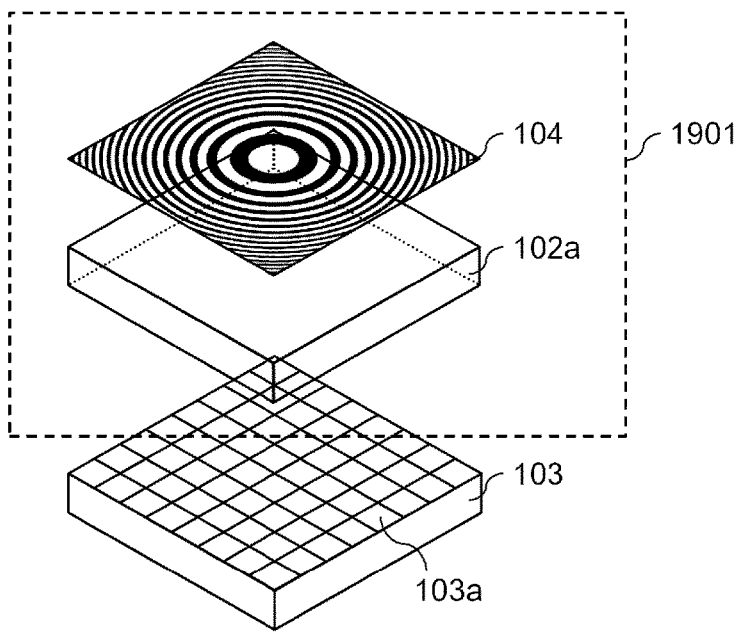

[Fig. 21]
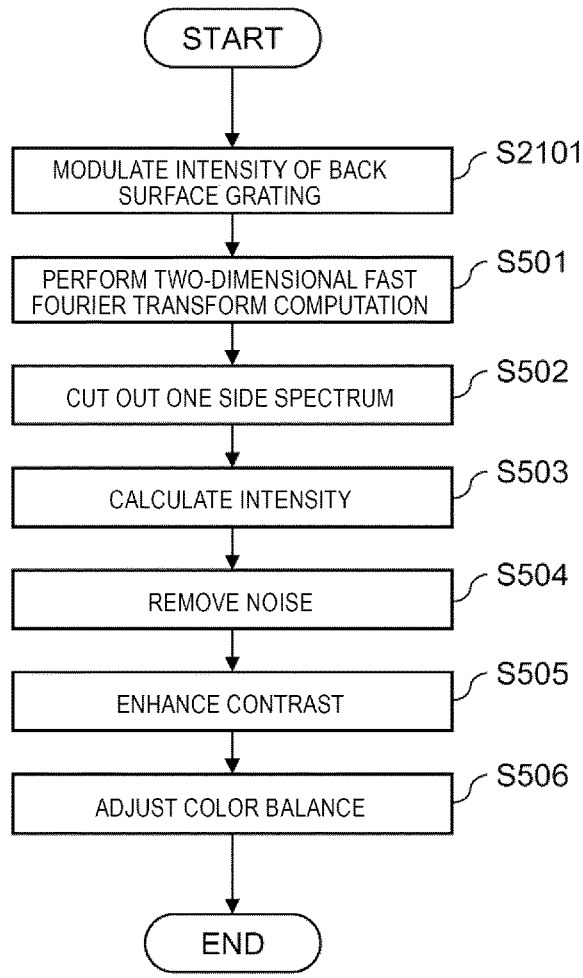
[Fig. 22]
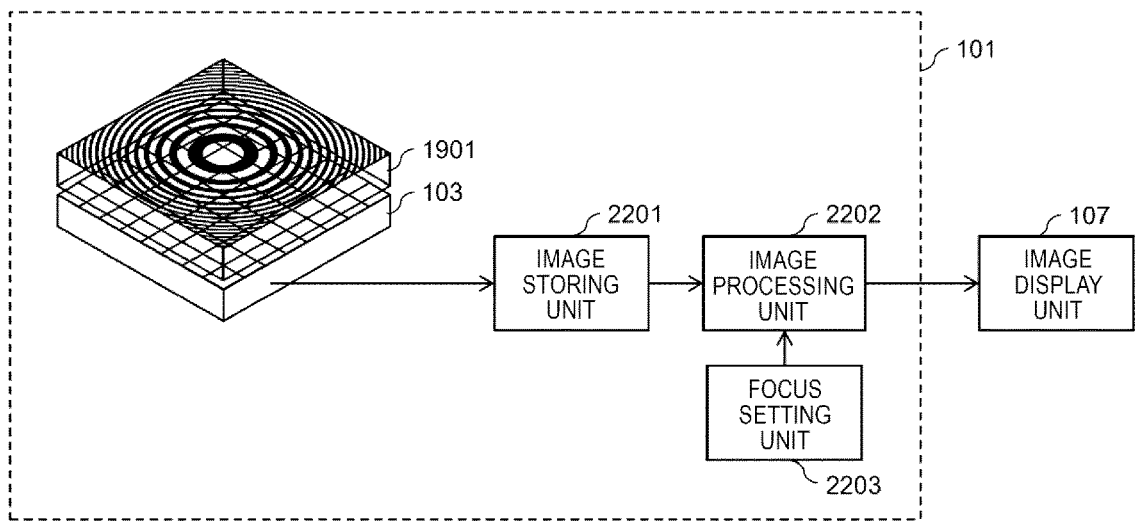

[Fig. 23]
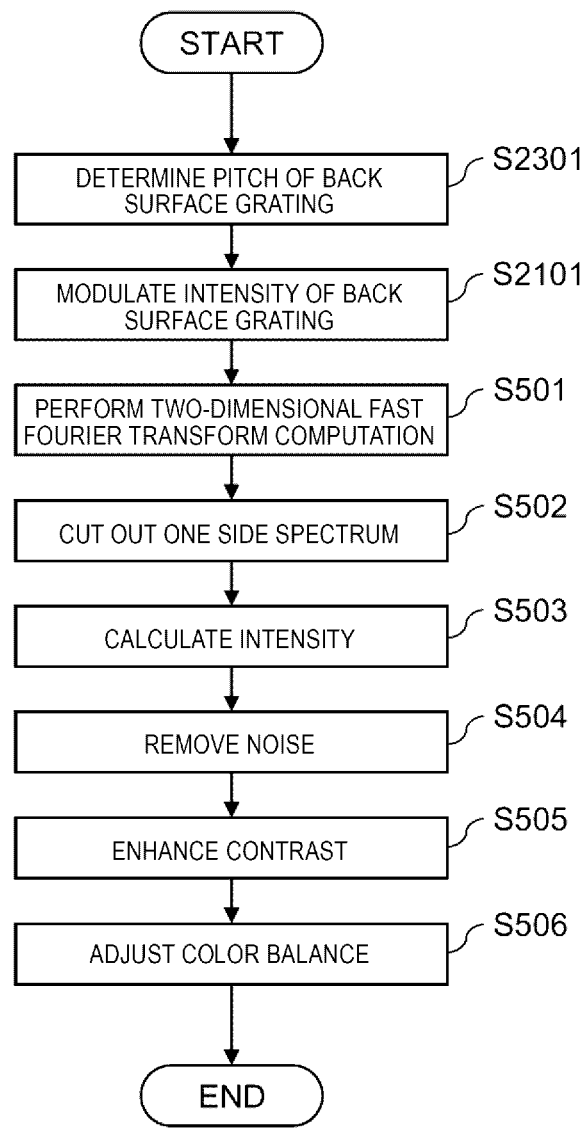

[Fig. 24]
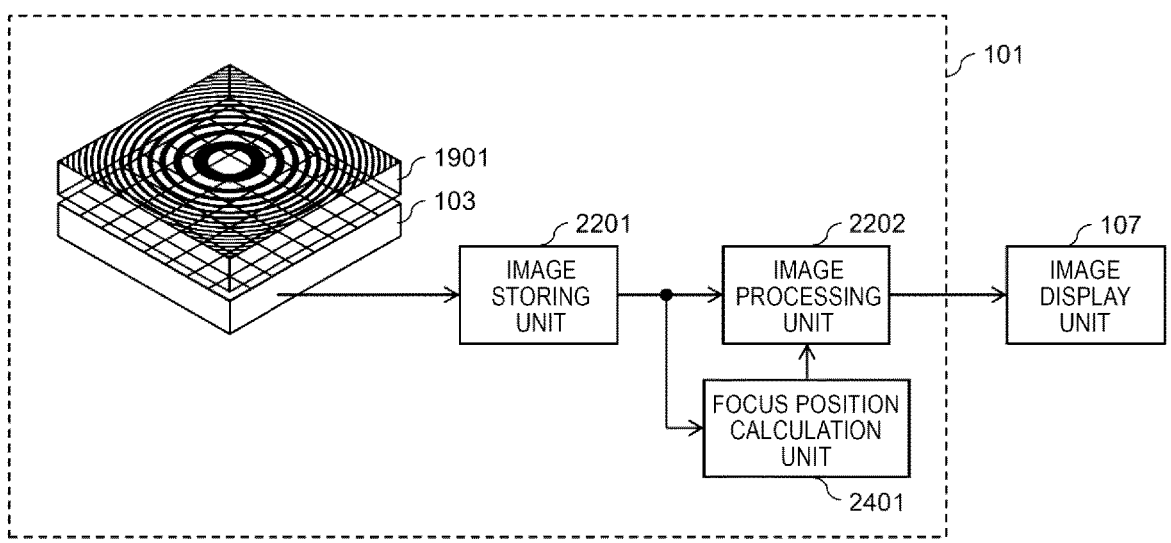

[Fig. 25]
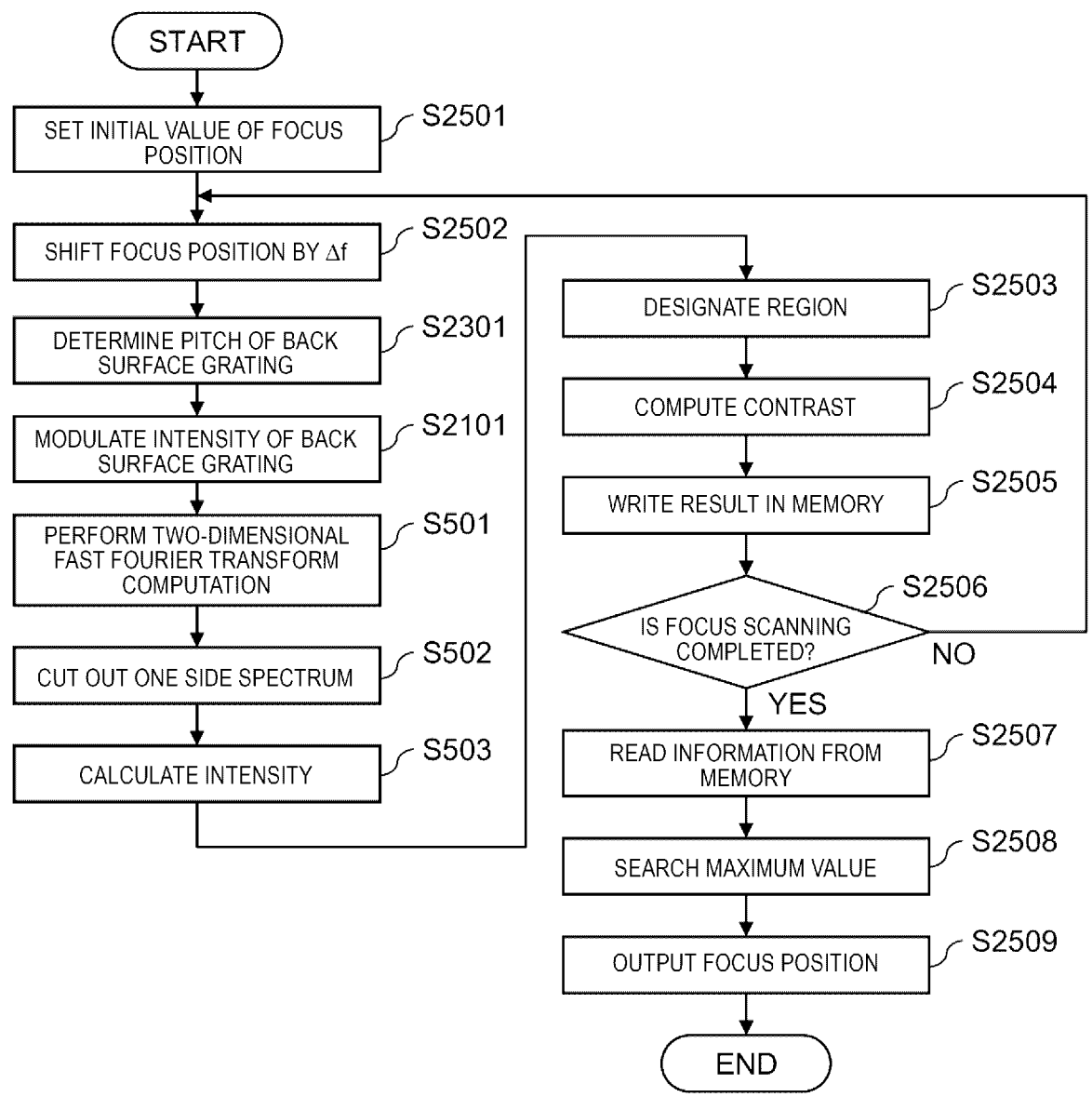

[Fig. 26]
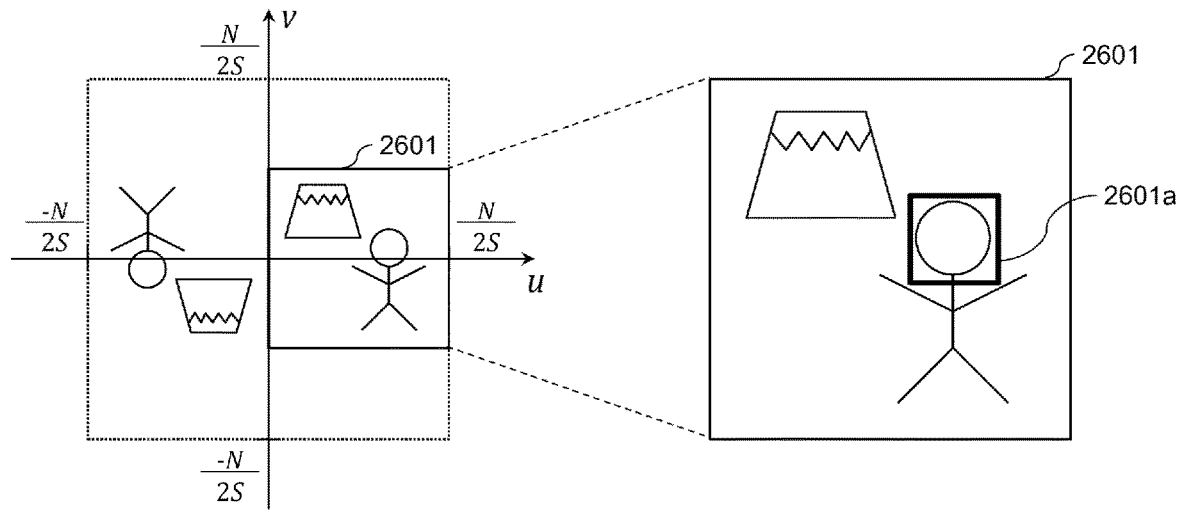
[Fig. 27]
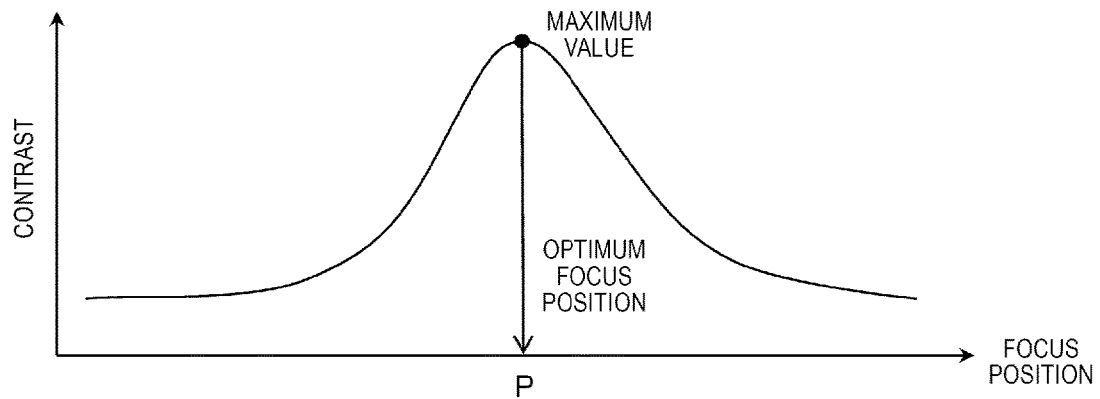
[Fig. 28]
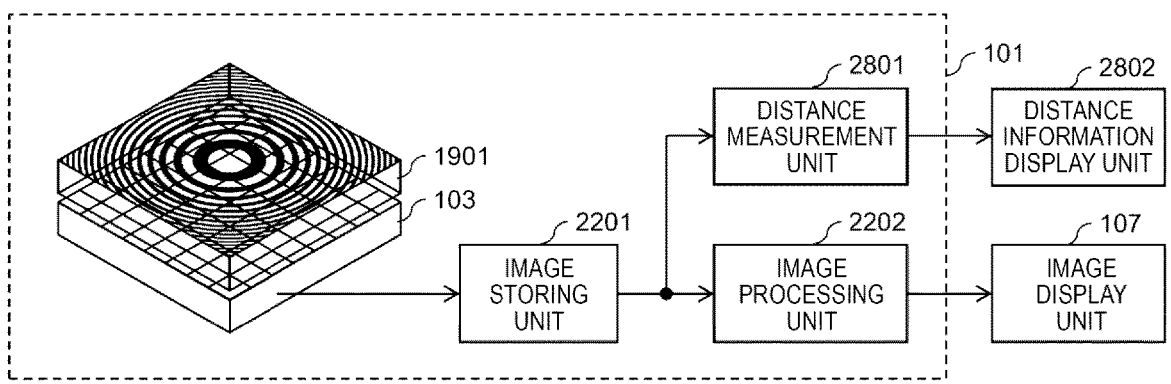

[Fig. 29]
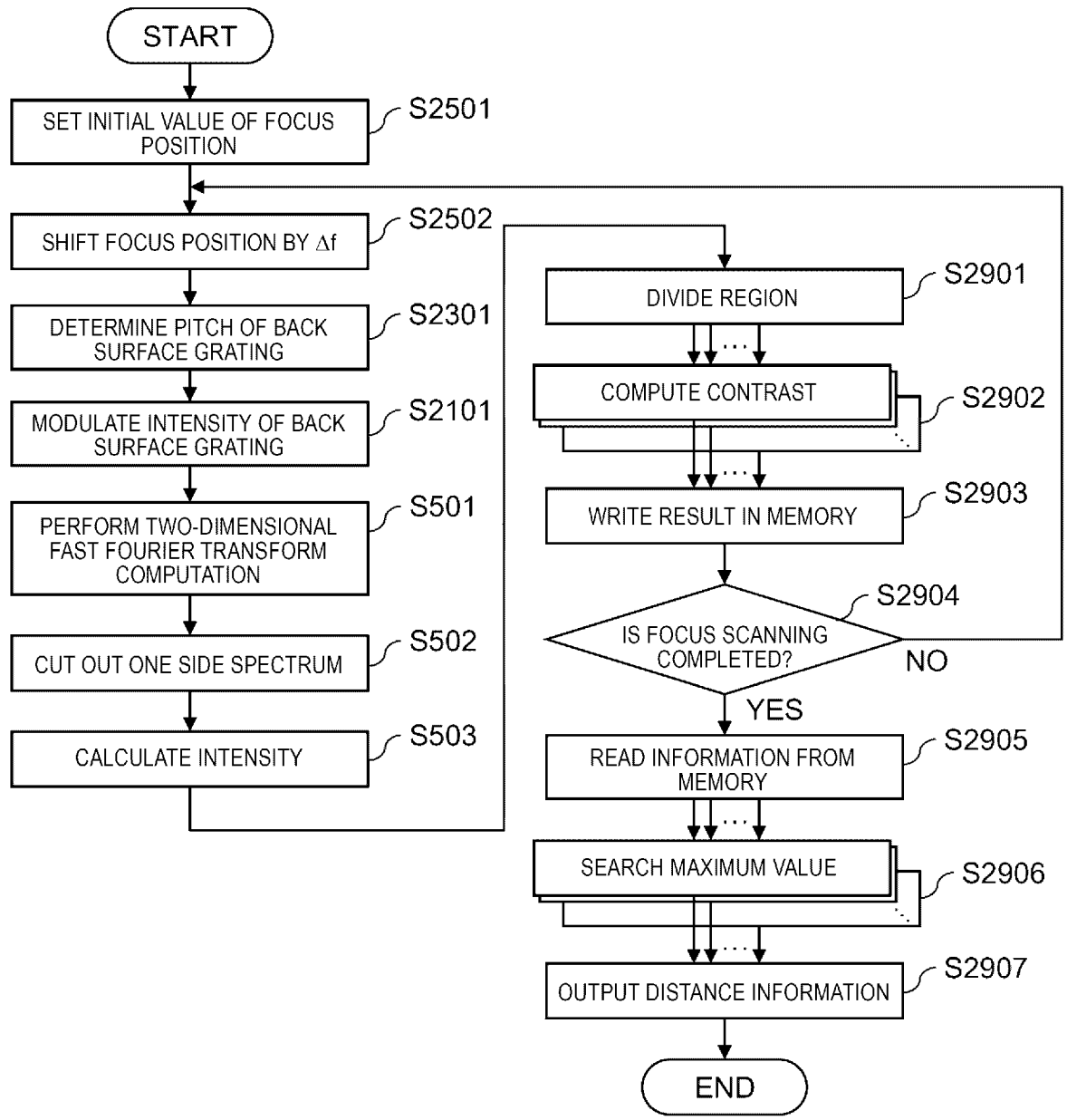

[Fig. 30]
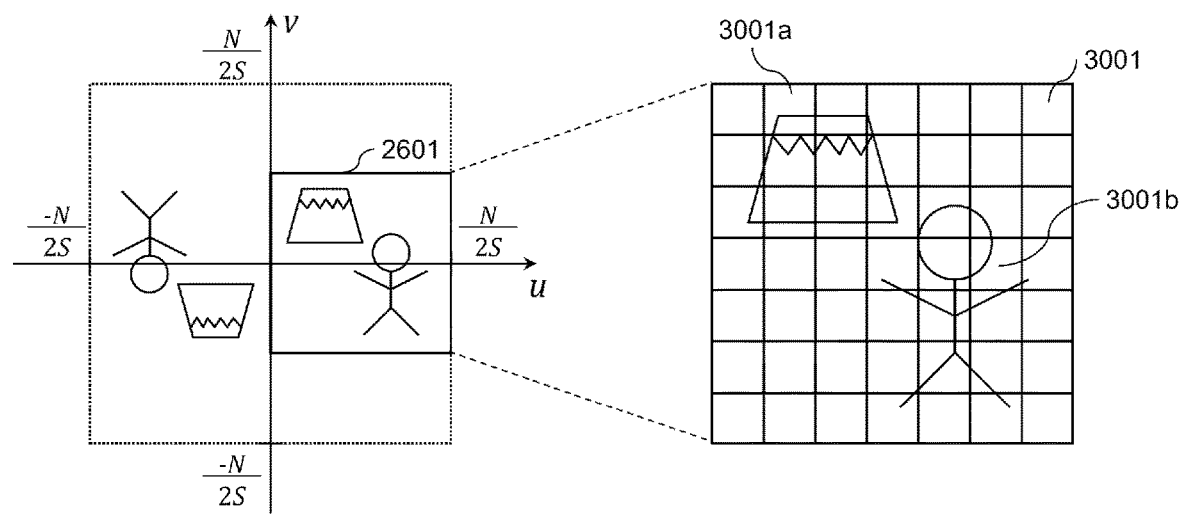
[Fig. 31]
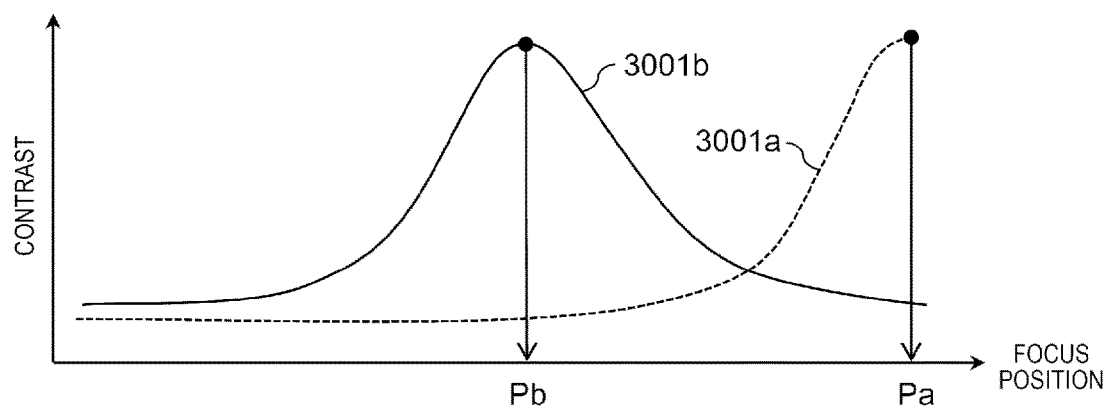

[Fig. 32]
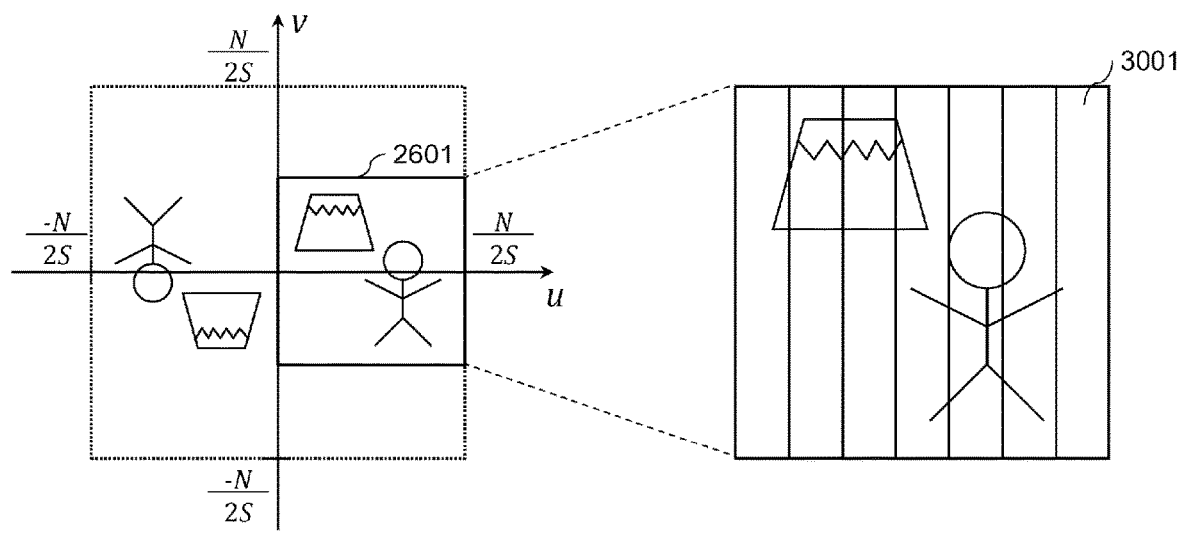
[Fig. 33]
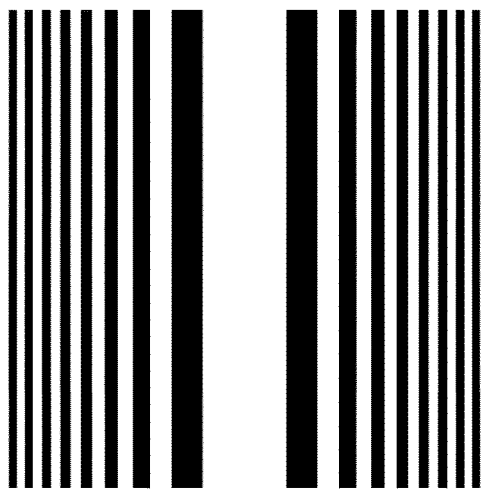

[Fig. 34]
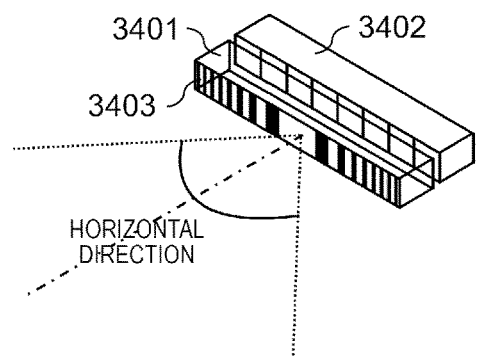
[Fig. 35]
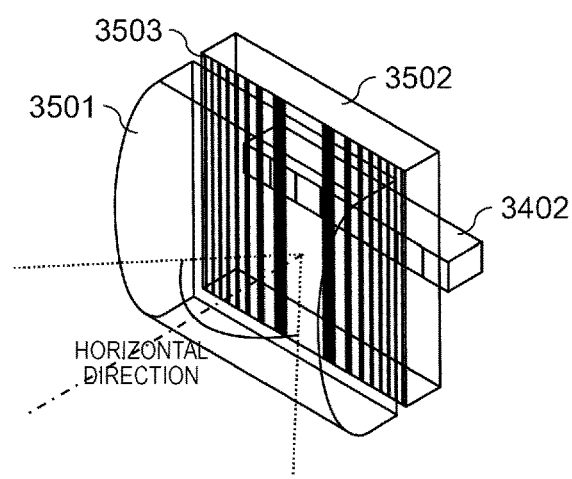
[Fig. 36]
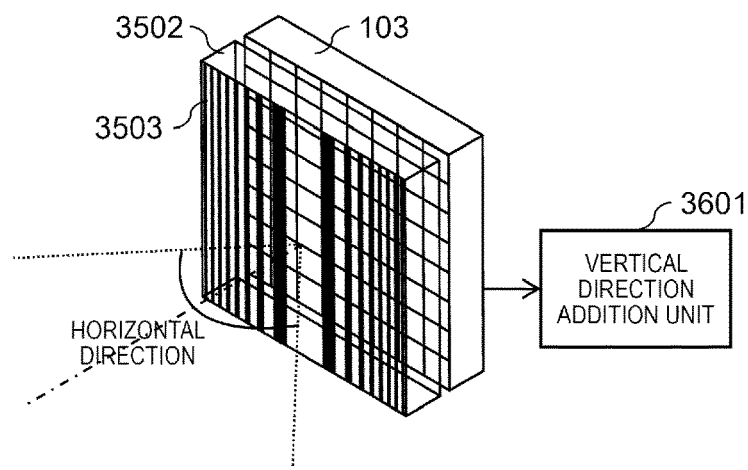

[Fig. 37]
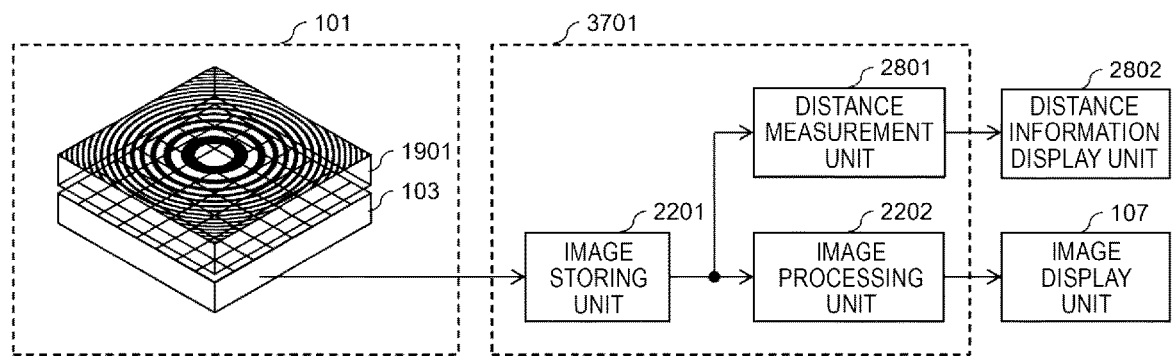
[Fig. 38]
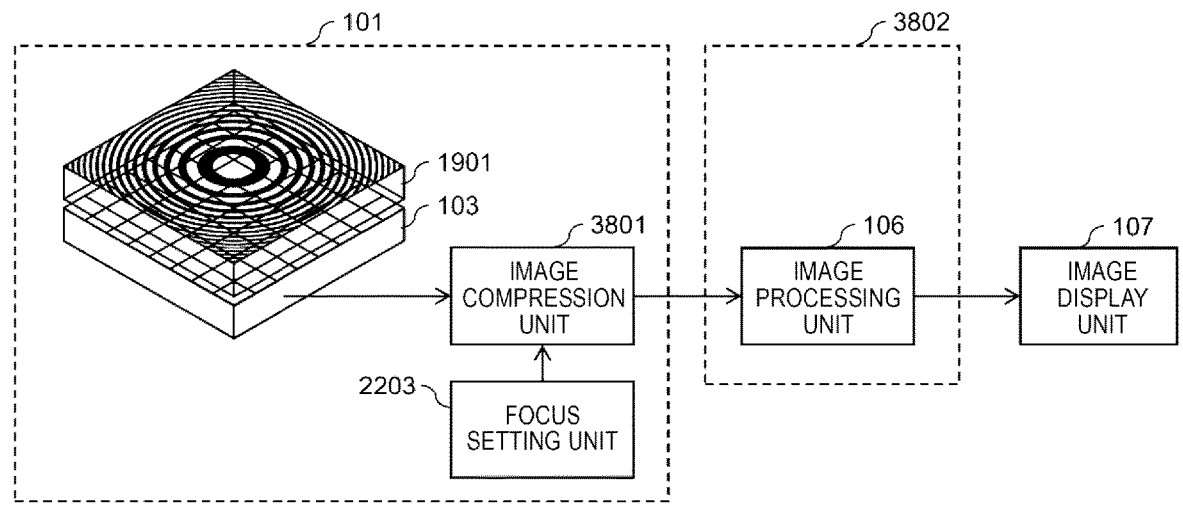

[Fig. 39]
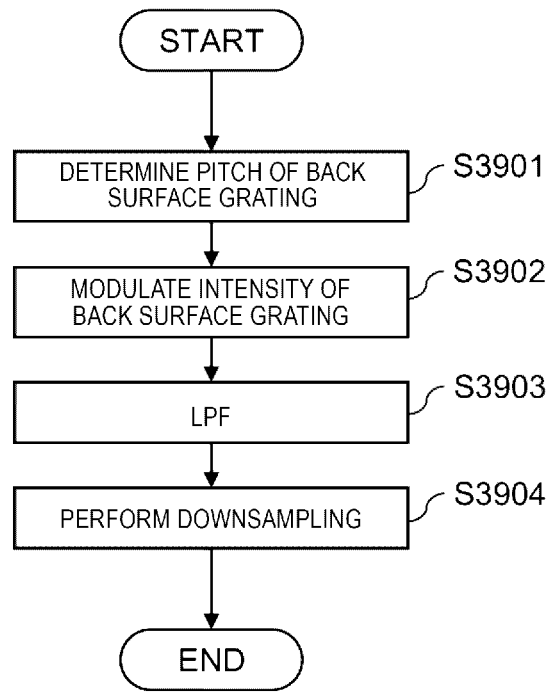

IMAGING DEVICE

TECHNICAL FIELD

The present invention relates to an imaging device, and in particular to a technique effective for high functionality of an imaging device.

BACKGROUND ART

A digital camera mounted on a smartphone or the like, an on-vehicle camera, and the like need to be thinner and have higher functionality. As a thinning technique of this type of digital camera, there is a technique for obtaining an object image without using a lens (for example, see PTL 1).

In this technique, a special diffraction grating substrate is attached to an image sensor, and an incident angle of incident light is obtained by an inverse problem from a projection pattern generated by light transmitted through the diffraction grating substrate on the image sensor so as to obtain an image of an object in the outside.

CITATION LIST

Patent Literature

PTL 1: U.S. Patent Application Publication No. 2014/0253781 A

SUMMARY OF INVENTION

Technical Problem

In PTL 1 described above, the pattern of the diffraction grating to be formed on an upper surface of the substrate attached to the image sensor is a special grating pattern such as a spiral shape. Then, an image of the object is obtained by solving the inverse problem for reproducing the image from a projection pattern received by the image sensor. However, there is a problem that computation in solving the inverse problem becomes complicated. In addition, although highly functional sensing is required for the digital camera and on-vehicle camera, the technique of PTL 1 does not consider high functionality.

An object of the present invention is to provide a technique that makes it possible to achieve high functionality of an imaging device using a simple computation.

Solution to Problem

The object described above can be achieved by, for example, the invention described in the claims.

Advantageous Effects of Invention realize an imaging device having high functionality such as focus adjustment (refocusing) after photographing, autofocus, and ranging.

BRIEF DESCRIPTION OF DRAWINGS

FIG. 1 is a diagram illustrating a basic example.
FIG. 2 is a diagram illustrating a modulator of the basic example.
FIG. 3 is a diagram illustrating another modulator of the basic example.
FIG. 4 is a diagram illustrating a state of photographing an object in the outside by the basic example.
FIG. 5 is a diagram illustrating a processing flow of an image processing unit of the basic example.
FIG. 6 is a diagram for explaining that a projection image from a front surface of a grating substrate to a back surface due to obliquely incident parallel light causes an in-plane deviation.
FIGS. 7A to 7C are schematic diagrams for explaining generation of moiré fringes and a frequency spectrum in a case where grating axes of both surfaces of the grating substrate are aligned.
FIG. 8 is a schematic diagram in a case where the axes of the front surface grating and the back surface grating are disposed to be deviated.
FIGS. 9A to 9C are schematic diagrams for explaining generation of the moiré fringes and the frequency spectrum in a case where the gratings on both surfaces of the grating substrate are disposed to be deviated.
FIG. 10 is a diagram illustrating an example of the grating pattern.
FIG. 11 is a diagram illustrating another example of the grating pattern.
FIG. 12 is a diagram for explaining an angle that light from each point constituting an object forms with respect to a sensor.
FIG. 13 is a diagram illustrating a spatial frequency spectrum in a case where an object is photographed.
FIG. 14 is a diagram illustrating that a front surface side grating pattern is projected in a case where the object is at an infinite distance.
FIG. 15 is a diagram illustrating an example of the moiré fringes generated when the object is at an infinite distance.
FIG. 16 is a diagram illustrating that the front surface side grating pattern is enlarged in a case where the object is at a finite distance.
FIG. 17 is a diagram illustrating an example of the moiré fringes generated in a case where the object is at a finite distance.
FIG. 18 is a diagram illustrating an example of the moiré fringes obtained by correcting a back surface side grating pattern in a case where the object is at a finite distance.
FIG. 19 is a diagram illustrating an example for realizing the back surface side grating pattern by image processing.
FIG. 20 is a diagram illustrating a modulator of the example for realizing the back surface side grating pattern by image processing.
FIG. 21 is a diagram illustrating a processing flow of an image processing unit of the example for realizing the back surface side grating pattern by image processing.
FIG. 22 is a diagram illustrating an example for realizing refocusing.
FIG. 23 is a diagram illustrating a processing flow of the image processing unit of the example for realizing refocusing.
FIG. 24 is a diagram illustrating the example for realizing autofocus.
FIG. 25 is a diagram illustrating a processing flow of a focus position calculating unit of the example realizing autofocus.
FIG. 26 is a diagram illustrating a contrast calculation region of the example realizing autofocus.
FIG. 27 is a diagram illustrating an optimum focus position of the example realizing autofocus.
FIG. 28 is a diagram illustrating an example for realizing ranging.

FIG. 29 is a diagram illustrating a processing flow of a ranging unit of the example for realizing ranging.

FIG. 30 is a diagram illustrating a contrast calculation region of the example for realizing ranging.

FIG. 31 is a diagram illustrating an optimum focus position of the example for realizing ranging.

FIG. 32 is a diagram illustrating another contrast calculation region of the embodiment for realizing ranging.

FIG. 33 is a diagram illustrating an example of a grating pattern.

FIG. 34 is a diagram illustrating configurations of a modulator and a sensor of an example for realizing ranging in a one-dimensional direction.

FIG. 35 is a diagram illustrating configurations of a modulator and a sensor of the example for realizing ranging in a one-dimensional direction.

FIG. 36 is a diagram illustrating configurations of a modulator and a sensor of the example for realizing ranging in a one-dimensional direction.

FIG. 37 is a diagram illustrating an example of a method of dividing processing.

FIG. 38 is a diagram illustrating another example of the method of dividing processing.

FIG. 39 is a diagram illustrating a processing flow of an image compression unit of an example for compressing image data capacity.

DESCRIPTION OF EMBODIMENTS

For the sake of convenience, in the following embodiments, description will be made by dividing the embodiments into a plurality of sections or embodiments, but unless otherwise specified, they are not unrelated to each other, and one embodiment is in a relationship such as a modification, details, supplementary explanation, and the like of a portion or all of the other embodiments.

In the following embodiments, in a case of referring to the number of elements (including number, numerical value, amount, range, and the like), it is not limited to the specific number and may be a specific number or more or less except for a case which is especially specified explicitly and a case where it is obviously limited to a specific number in principle.

Furthermore, in the following embodiments, it goes without saying that the constituent elements (including element steps and the like) are not necessarily indispensable except for a case where it is explicitly stated and a case where it is considered to be obviously indispensable in principle.

Similarly, in the following embodiments, in a case of referring to the shape, positional relationship, and the like of constituent elements and the like, matters which are approximate to or similar to its shape and the like are regarded as being included except for a case where it is expressly stated and a case where it is considered obviously not the case in principle. This also applies to the numerical values and ranges described above.

In all the drawings for explaining the embodiments, the same members are denoted by the same reference symbols in principle, and repetitive description thereof will be omitted.

Examples of the present invention will be described below with reference to the drawings.

Example 1

<Photographic Principle for Object at Infinity>

FIG. 1 is an explanatory diagram illustrating an example of a configuration in an imaging device 101 according to of the present embodiment 1. The imaging device 101 acquires an image of an object in the outside without using a lens to form an image and is constituted with a modulator 102, an image sensor 103, and an image processing unit 106 as shown in FIG. 1.

FIG. 2 illustrates an example of the modulator 102. The modulator 102 is fixed in close contact with a light receiving surface of the image sensor 103, and has a configuration in which a first grating pattern 104 and a second grating pattern 105 are formed on a grating substrate 102a, respectively. The grating substrate 102a is made of, for example, a transparent material such as glass or plastic. Hereinafter, the image sensor 103 side of the grating substrate 102a is referred to as a back surface and a facing surface, that is, an object be photographed side is referred to a front surface. The grating patterns 104 and 105 composed of concentric grating patterns in which an interval of the grating patterns, that is, a pitch becomes narrower in inverse proportion to a radius from the center as it goes to the outside. The grating patterns 104 and 105 are formed by depositing aluminum or the like by a sputtering method or the like used for a semiconductor process, for example. Shades are given by a pattern in which aluminum is deposited and a pattern in which aluminum is not deposited. Formation of the grating patterns 104 and 105 is not limited thereto and the grating patterns 104 and 105 may be formed with shading by printing by an ink jet printer or the like, for example.

Here, in order to realize the modulator 102, although a method of forming the grating patterns 104 and 105 on the grating substrate 102a has been described, as shown in FIG. 3, it is also possible to realize the modulator 102 by a configuration in which the grating patterns 104 and 105 are formed into thin films and held by a support member 102b.

Intensity of light transmitted through the grating patterns 104 and 105 is modulated by the grating patterns 104 and 105. Light transmitted through the grating patterns 104 and 105 is received by the image sensor 103. The image sensor 103 is constituted with, for example, a charge coupled device (CCD) image sensor or a complementary metal oxide semiconductor (CMOS) image sensor.

On the front surface of the image sensor 103, pixels 103a which are light receiving elements are regularly disposed in a grating pattern. The image sensor 103 converts an optical image received by the pixels 103a into an image signal which is an electric signal. The image signal output from the image sensor 103 is subjected to image processing by an image processing unit 106 which is an image processing unit, and is output to an image display unit 107 or the like.

FIG. 4 is an explanatory diagram illustrating an example of photographing by the imaging device 101 in FIG. 1. FIG. 4 illustrates an example in which a subject 401 is photographed by the imaging device 101 and is displayed on the image display unit 107. As illustrated in the figure, when the subject 401 is photographed, photographing is performed in such a way that the front surface in the modulator 102, specifically, the surface of the grating substrate 102a, on which the first grating pattern 104 is formed, directly faces the subject 401.

Subsequently, an outline of image processing by the image processing unit 106 will be described. FIG. 5 is a flowchart illustrating an outline of image processing by the image processing unit 106 included in the imaging device 101 in FIG. 1.

First, a frequency spectrum is obtained by performing a two-dimensional Fast Fourier Transform (FFT) computation for each color component of Red, Green, and Blue (RGB) on a moiré fringe image output from the image sensor 103 (Step S501). Subsequently, after cutting out data of one side frequency of the frequency spectrum by processing in Step S501 (Step S502), an image is acquired by performing calculation of intensity of the frequency spectrum (Step S503). Then, noise removal processing is performed on the obtained image (Step S504), and subsequently, contrast enhancement processing and the like is performed (Step S505). Thereafter, color balance of the image is adjusted (Step S506) and the image is output as a photographed image. Thus, image processing by the image processing unit 106 is ended.

Subsequently, a photographic principle of the imaging device 101 will be described. First, the concentric grating patterns 104 and 105 of which the pitch becomes smaller in inverse proportion to the radius from the center are defined as follows. In a laser interferometer or the like, a case where a spherical wave close to a plane wave and a plane wave used as reference light are made to interfere with each other is assumed. When a radius from a reference coordinate which is the center of the concentric circle is set as r, and a phase of the spherical wave in there is set as $\phi(r)$, $\phi(r)$ can be represented as Expression 1 by using a coefficient $\beta$ which determines magnitude of curvature of a wavefront.

$$\phi(r) = \beta r^2 \qquad \text{[Expression 1]}$$

The reason the phase is represented by a square of the radius r despite the spherical wave is that it can be approximated only by the lowest order in development because it is a spherical wave close to a plane wave. If the plane wave is made to interfere with light having the phase distribution, intensity distribution of interference fringes as represented Expression 2 is obtained.

$$I(r) = \frac{1}{4}|\exp i\phi(r) + 1|^2 = \frac{1}{2}(1 + \cos\phi) = \frac{1}{2}(1 + \cos\beta r^2) \qquad \text{[Expression 2]}$$

This becomes fringes of concentric circles having bright lines at radial positions that satisfy Expression 3.

$$\phi(r) = \beta r^2 = 2n\pi \ (n=0,1,2,\ldots) \qquad \text{[Expression 3]}$$

When the pitch of the fringes is set as p, Expression 4 is obtained and it can be seen that the pitch becomes narrower in inverse proportion to the radius.

$$p\frac{d}{dr}\phi(r) = 2p\beta r = 2\pi, \ p(r) = \frac{\pi}{\beta r} \qquad \text{[Expression 4]}$$

A plate having such fringes is called a Fresnel zone plate and a Gabor zone plate. A grating pattern having transmittance distribution proportional to the intensity distribution defined as such is used as the grating patterns 104 and 105 illustrated in FIG. 1.

It is assumed that parallel light is incident onto the modulator 102 having the thickness t with such a grating pattern formed on both surface at an angle $\theta_0$ as illustrated in FIG. 6. Light of which an angle of refraction in the modulator 102 is $\theta$ is geometrically and optically multiplied by transmittance of the grating of the front surface is incident onto the back surface by being deviated by $\delta = t \cdot \tan \theta$, and if it is assumed that the centers of the two concentric gratings are formed so as to be aligned, transmittance of the grating of the back surface is multiplied by deviating by $\delta$. In this case, an intensity distribution like Expression 5 is obtained.

$$I(x,y)I(x+\delta,y) = \qquad \text{[Expression 5]}$$
$$\frac{1}{4}\{1+\cos\beta(x^2+y^2)\}\{1+\cos\beta((x+\delta)^2+y^2)\} =$$
$$\frac{1}{8}\{2 + 4\cos\beta(r^2+\delta x)\cos\delta\beta x +$$
$$\cos 2\beta(r^2+\delta x) + \cos 2\delta\beta x\}$$

It can be seen that a fourth term of a development expression is formed in a region where two straight fringe patterns at equal intervals are overlapped in the direction of deviation of the two gratings. Such Fringes that occur at relatively low spatial frequencies due to superimposition of fringes and fringes are called moiré fringes. Such straight fringes at equal intervals causes a sharp peak to occur in the spatial frequency distribution obtained by the two-dimensional FFT of the detected image. It is possible to obtain a value of $\delta$, that is, the incident angle $\theta$ of light beam from the value of the frequency. It is obvious that such moiré fringes obtained uniformly spaced at equal intervals on the entire surface occur at the same pitch regardless of the direction of deviation because of symmetry of arrangement of concentric gratings. Such fringes are obtained by forming the grating patterns in the Fresnel zone plate or the Gabor zone plate, and it is considered difficult to obtain uniform fringes on the entire surface with other grating patterns. However, the aim is to obtain moiré fringes which are uniformly spaced at equal intervals on the entire surface, and the grating pattern is not limited to the Fresnel zone plate or Gabor zone plate.

Even in the second term, it can be seen that fringes in which intensity of the Fresnel zone plate is modulated by moiré fringes occur, but since the frequency spectrum of a product of two fringes is a convolution of each Fourier spectrum, a sharp peak is not obtained.

From Expression 5, if only the component having a sharp peak is extracted like Expression 6, its Fourier spectrum becomes like Expression 7.

$$I(x,y) = \frac{1}{8}(2 + \cos 2\delta\beta x) \qquad \text{[Expression 6]}$$

$$F[I(x,y)] = \frac{1}{8}F[2 + \cos 2\delta\beta x] = \qquad \text{[Expression 7]}$$
$$\frac{1}{4}\delta(u,v) + \frac{1}{8}\delta\left(u+\frac{\delta\beta}{\pi},v\right) + \frac{1}{8}\delta\left(u-\frac{\delta\beta}{\pi},v\right).$$

Here, F represents computation of the Fourier transform, u and v are the spatial frequency coordinates in the x and y directions, and $\delta$ with the parentheses are delta functions. From this result, it can be seen that the peak of the spatial frequency of the moiré fringes occurs at the position of $u = \pm\delta\beta/\pi$ in the spatial frequency spectrum of the detected image.

This state is illustrated in FIG. 7. In FIG. 7, from the left to the right, an arrangement diagram of the light beam and the modulator 102, the moiré fringes, and the schematic diagram of the spatial frequency spectrum are respectively illustrated. FIG. 7(a) illustrates vertical incidence, FIG. 7(b) illustrates a case where a light beam is incident at an angle θ from the left side, and FIG. 7(c) illustrates a case where the light beam is incident at an angle θ from the right side.

The axes of the first grating pattern 104 formed on the front surface side of the modulator 102 and the second grating pattern 105 formed on the back surface side are aligned. In FIG. 7(a), shadows of the first grating pattern 104 and the second grating pattern 105 are coincident and thus, moiré fringes do not occur.

In FIGS. 7(b) and 7(c), since deviation of the first grating pattern 104 and deviation of the second grating pattern 105 are equal, the same moiré occurs and the peak positions of the spatial frequency spectrum are also coincident, and it is not possible to distinguish whether the incident angle of the light beam corresponds to a case of FIG. 7(b) or a case of FIG. 7(c), from the frequency spectrum.

In order to avoid this, for example, as illustrated in FIG. 8, it is necessary to relatively deviate the two grating patterns 104 and 105 with respect to the optical axis in advance so that the shadows of the two grating patterns are overlapped even for light beams incident vertically to the modulator 102. When relative deviation of the shadows of the two gratings with respect to the vertical incident plane wave on the axis is set as $\delta_0$, deviation $\delta$ caused by the plane wave of the incident angle θ is represented as Expression 8.

$$\delta = \delta_0 + t \tan\theta \quad \text{[Expression 8]}$$

In this case, the peak of the spatial frequency spectrum of moiré fringes of the light beam of incidence angle θ is the position of Expression 9 on the plus side of the frequency.

$$u = \frac{\delta\beta}{\pi} = \frac{1}{\pi}(\delta_0 + t\tan\theta)\beta \quad \text{[Expression 9]}$$

When the size of the image sensor is set as S and both the number of pixels in the x-direction and y-direction of the image sensor are set as N, the spatial frequency spectrum of an discrete image by the fast Fourier transform (FFT) is obtained in a range of $-N/(2S)$ to $+N/(2S)$. From this, when considering that the incident angle on the plus side and the incident angle on the minus side are equally received, it is reasonable to set the spectral peak position of the moiré fringe due to the vertical incident plane wave (θ=0) to the center position between the origin (DC: direct current component) position and, for example, the frequency position at the + side end, that is, the spatial frequency position of Expression 10.

$$\frac{\delta_0\beta}{\pi} = \frac{N}{4S} \quad \text{[Expression 10]}$$

Accordingly, it is reasonable to set relative center position deviation between the two gratings to be Expression 11.

$$\delta_0 = \frac{\pi N}{4\beta S} \quad \text{[Expression 11]}$$

FIG. 9 is a schematic diagram for explaining generation of the moiré fringes and a frequency spectrum in a case where the first grating pattern 104 and the second grating pattern 105 are disposed to be deviated from each other. Similarly to FIG. 7, the left side illustrates an arrangement diagram of the light beam and the modulator 102, a middle row illustrates moiré fringes, and the right side illustrates the spatial frequency spectrum. FIG. 9(a) illustrates a case where the light beam is perpendicularly incident, FIG. 9(b) illustrates a case where the light beam is incident at the angle θ from the left side, and FIG. 9(c) illustrates a case where the light beam is incident at the angle θ from the right side.

The first grating pattern 104 and the second grating pattern 105 are deviated by $\delta_0$ in advance. For that reason, even in FIG. 9(a), the moiré fringes occur, and a peak appears in the spatial frequency spectrum. The deviation amount $\delta_0$ is set so that the peak position appears at the center of the spectrum range at one side from the origin as described above. In this case, since the deviation δ becomes larger in FIG. 9(b) and becomes smaller in FIG. 9(c), unlike FIG. 7, the difference between FIG. 9(b) and FIG. 9(c) can be distinguished from the peak position of the spectrum. That is, the spectral image of this peak is a bright point indicating a light flux at infinity and it is not different from the photographed image by the imaging device 101 in FIG. 1.

When the maximum angle of incidence angle of parallel light that can be received is set as θmax, from Expression 12, the maximum viewing angle that can be received by the imaging device 101 is given by Expression 13.

$$u_{max} = \frac{1}{\pi}(\delta_0 + t\tan\theta_{max})\beta = \frac{N}{2S} \quad \text{[Expression 12]}$$

$$\tan\theta_{max} = \frac{\pi N}{4t\beta S} \quad \text{[Expression 13]}$$

From analogy with forming of image using a general lens, when considering that parallel light of the angle of view θmax is received by focusing at the end of the image sensor, it can be considered that an effective focal length of the imaging device 101 not using the lens corresponds to Expression 14.

$$f_{\mathit{eff}} = \frac{S}{2\tan\theta_{max}} = \frac{2t\beta S^2}{\pi N} \quad \text{[Expression 14]}$$

Here, it can be seen from Expression 13 that the viewing angle can be changed by the thickness t of the modulator 102 and the coefficient β of the grating patterns 104 and 105. Accordingly, for example, when the modulator 102 has the configuration of FIG. 3 and has a function of changing the length of the support member 102b, it is also possible to perform photographing by changing the viewing angle at the time of photographing.

As illustrated in Expression 2, it is assumed that the transmittance distribution of the grating pattern basically has a sinusoidal characteristic. However, it suffices if such a component is present as the fundamental frequency component of the grating pattern. For example, as illustrated in FIG. 10, it is also possible to binarize transmittance of the grating pattern. Furthermore, as illustrated in FIG. 11, it is also conceivable to increase transmittance by widening the width of the region having high transmittance by changing the duty of the grating region having high transmittance and the grating region having low transmittance. With this, effects such as suppression of diffraction from the grating pattern can be obtained, and deterioration of the photographed image can be reduced.

In the above description, in both cases, only one incident angle is simultaneously incident, however, in order for the imaging device 101 to actually act as a camera, it is necessary to assume a case where light beams having a plurality of incident angles are simultaneously incident. Such light beams having a plurality of incident angles cause the images of a plurality of front surface side gratings to overlap each other at the time when the light beams are incident on the grating pattern on the back surface side. If these mutually generate the moiré fringes, there is a concern that it may become noise which hinders detection of the moiré fringes with the second grating pattern 105 which is a signal component. In practice, however, overlapping of the images of the first grating pattern 104 does not cause a peak of the moiré image to occur, and only overlapping with the second grating pattern 105 on the back surface side causes the peak to occur. The reason will be described below.

First, it is a big difference that overlapping of the shadows of the first grating pattern 104 on the front surface side by the light beams of a plurality of incident angles is not a product but a sum. In overlapping of the shadow of the first grating pattern 104 and the second grating pattern 105 due to light having one incident angle, the light intensity distribution after transmitting through the second grating pattern 105 on the back surface side is obtained by multiplying the light intensity distribution which is the shadow of the first grating pattern 104 by transmittance of the second grating pattern 105.

In contrast, since overlapping of the shadows caused by a plurality of light beams having different angles and incident on the first grating pattern 104 on the front surface side is overlapping of the light beams and thus, it is not the product but the sum. In the case of sum, it becomes a distribution obtained by multiplying the distribution of the gratings of the original Fresnel zone plate by the distribution of the moiré fringes like Expression 15.

$$I(x, y) + I(x + \delta, y) = $$
$$\frac{1}{2}\{1 + \cos\beta(x^2 + y^2)\} + \frac{1}{2}\{1 + \cos\beta((x + \delta)^2 + y^2)\} =$$
$$1 + \cos\beta(r^2 + \delta x)\cos\delta\beta x$$

[Expression 15]

Accordingly, its frequency spectrum is represented by an overlap integral of each frequency spectrum. For that reason, even if the moiré spectrum alone has a sharp peak, in practice, only a ghost of the frequency spectrum of the Fresnel zone plate occurs at that position. That is, a sharp peak does not occur in the spectrum. Therefore, even if light beams having a plurality of incident angles are incident, the spectrum of the moiré image detected is always only the moiré of the product of the first grating pattern 104 on the front surface side and the second grating pattern 105 on the back surface side, and as long as the second grating pattern 105 is single, the peak of the spectrum to be detected is only one for one incident angle.

Here, correspondence between parallel light which has been described to detect and light from an actual object will be schematically described with reference to FIG. 12. FIG. 12 is a diagram for explaining an angle that light from each point constituting an object forms with respect to an image sensor. Strictly speaking, light from each point constituting a subject 401 is a spherical wave from a point light source and is incident onto the modulator 102 and the image sensor 103 (hereinafter, referred to as a grating sensor integrated substrate 1201 in FIG. 12) of the imaging device 101 in FIG. 1. In this case, when the grating sensor integrated substrate is sufficiently small relative to the subject 401 or it is sufficiently far away, the incident angle of light illuminating the grating sensor integrated substrate from each point can be considered to be the same.

From the relationship that a spatial frequency displacement Au of the moiré with respect to a minute angular displacement AO obtained from Expression 9 is 1/S or less, which is minimum resolution of the spatial frequency of the image sensor, the condition that AO can be regarded as parallel light is represented like Expression 16.

$$\Delta u = \frac{1}{\pi}\beta t \Delta\theta \le \frac{1}{S}, \Delta\theta \le \frac{\pi}{S\beta t}$$

[Expression 16]

Under this condition, it is possible to image an object at infinity by the imaging device of the present invention, and from the discussion so far, it is possible to obtain an image as illustrated in FIG. 13 by fast Fourier transform (FFT).
<Photographic Principle of Finite Distance Object>

Here, a state of projection of the first grating pattern 104 on the front surface side to the back surface side in the case of infinity described so far is illustrated in FIG. 14. A spherical wave from a point 1401 constituting an object at infinity becomes a plane wave while propagating a sufficiently long distance and in a case where the first grating pattern 104 on the front surface side is irradiated with the plane wave and a shadow 1402 thereof is projected on the lower surface, the shadow has substantially the same shape as that of the first grating pattern 104. As a result, it is possible to obtain straight moiré fringes at equal intervals (FIG. 15) by multiplying the shadow 1402 by the transmittance distribution of the grating pattern (corresponding to the second grating pattern 105 in FIG. 1) of the back surface side.

On the other hand, imaging for an object at finite distance will be described. FIG. 16 is an explanatory diagram illustrating that projection of the first grating pattern 104 on the front surface side to the back surface side is enlarged from the first grating pattern 104 in a case where the object to be imaged is at a finite distance. As illustrated in FIG. 16, in a case where the first grating pattern 104 on the front surface side is irradiated with a spherical wave from a point 1601 constituting an object and a shadow 1602 is projected on the lower surface, the shadow is expanded almost uniformly. This enlargement ratio α can be calculated like Expression 17 using a distance f from the first grating pattern 104 to the point 1601.

$$\alpha = \frac{f + t}{f}$$

[Expression 17]

For that reason, if the transmittance distribution of the grating pattern on the back surface side designed for parallel light is directly multiplied, straight moiré fringes at equal intervals do not occur (FIG. 17). However, if the second grating pattern 105 is enlarged according to the shadow of the uniformly enlarged first grating pattern 104 on the front surface side, it is possible to generate the straight moiré fringes at equal intervals again for the enlarged shadow 1602 (FIG. 18). For this purpose, it is possible to make correction by setting the coefficient β of the second grating pattern 105 to β/α.

With this, it is possible to selectively reproduce light from the point 1601 having a distance which is not necessarily at infinity. As a result, it is possible to perform photographing while focusing on any position.

Next, a method for simplifying the configuration of the modulator 102 will be described. In the modulator 102, an image is formed by detecting the angle of the incident parallel light from the spatial frequency spectrum of the moiré fringes, by forming the first grating pattern 104 and the second grating pattern 105 having the same shape respectively on the front surface and the back surface of the grating substrate 102$a$ so as to be deviated from each other. The second grating pattern 105 on the back surface side is an optical element which is in close contact with the image sensor 103 and modulates intensity of incident light, and is the same grating pattern regardless of incident light. Therefore, as illustrated in FIG. 19, processing corresponding to the second grating pattern 105 may be executed by an intensity modulation portion 1903 in an image processing unit 1902 using a modulator 1901 from which the second grating pattern 105 is removed.

Details of the configuration of the modulator 1901 in this case are illustrated in FIG. 20. With the present configuration, one grating pattern to be formed on the grating substrate 102$a$ can be reduced. With this, the manufacturing cost of the modulator can be reduced.

FIG. 21 is a flowchart illustrating an outline of image processing by the image processing unit 1902 in FIG. 19. Processing in Step S2101 is the difference of the flowchart of FIG. 21 from the flowchart of FIG. 5. In processing of Step S2101, the intensity modulation portion 1903 described above generates a moiré fringe image corresponding to transmission through the grating pattern 105 on the back surface side with respect to the image output from the image sensor 103. Specifically, since it suffices if perform computation corresponding to Expression 5, it is sufficient to generate the grating pattern 105 on the back surface side in the intensity modulation portion 1903 and multiply the image of the image sensor 103 by it. Furthermore, if the grating pattern 105 on the back surface side is a binarized pattern as illustrated in FIGS. 10 and 11, it can also be realized only by setting the value of the image sensor 103 in the region corresponding to black to 0. With this, it is possible to suppress the scale of a multiplication circuit. Subsequently, processing in steps S501 to S506 in FIG. 21 is the same as processing in FIG. 5 and thus, description thereof will be omitted here.

In this case, the pitch of the pixels 103$a$ of the image sensor 103 needs to be fine enough to sufficiently reproduce the pitch of the first grating pattern 104 or rough enough so that the pitch of the first grating pattern 104 can be reproduced by the pitch of the pixels 103$a$. In the case of forming a grating pattern on both surfaces of the grating substrate 102$a$, it is not always necessary that the pitch of the grating pattern can be resolved by the pixel 103$a$ of the image sensor 103, and it suffices if only the moiré image can be resolved. However, in the case of reproducing a grating pattern by image processing, resolution of the grating pattern and resolution of the image sensor 103 need to be equal.

In the foregoing, although processing corresponding to the second grating pattern 105 is realized by the intensity modulation portion 1903, since the second grating pattern 105 is an optical element which is in close contact with the image sensor and modulates the intensity of incident light, it can also be realized by setting sensitivity of the sensor effectively by taking account of transmittance of the second grating pattern 105.

According to the configuration in which the second grating pattern 105 on the back surface side described above is performed by the image processing unit, it is also possible to focus on any distance after photographing. The configuration in this case is illustrated in FIG. 22. The difference from FIG. 19 is an image storing unit 2201, an image processing unit 2202, and a focus setting unit 2203. The image storing unit 2201 is provided to temporarily store an image output from the image sensor 103 so as to enable focus adjustment after photographing. The focus setting unit 2203 can set a focus distance by a knob provided in the imaging device 101, a graphical user interface (GUI) of a smartphone, and the like, and outputs focus distance information to the image processing unit 2202.

FIG. 23 is a flowchart illustrating an outline of image processing by the image processing unit 2202 in FIG. 22. Processing in Step S2301 is the difference of the flowchart of FIG. 23 from the flowchart in FIG. 21. In processing of Step S2301, the enlargement ratio $\alpha$ is calculated from Expression 17 based on the focus distance information that is the output of the focus setting unit 2203 described above, and computation with the coefficient $\beta$ of the second grating pattern 105 on the back surface side as $\beta/\alpha$ is performed. Thereafter, in S2101, based on the coefficient, a moiré fringe image corresponding to transmission through the grating pattern on the back surface side is generated. Subsequently, processing in steps S501 to S506 in FIG. 23 is the same as processing in FIG. 5 and thus, description thereof will be omitted here.

According to the method and the configuration described above, an image of an object in the outside can be obtained by the simple computation such as fast Fourier transform (FFT) and furthermore, the focus can be adjusted to any distance after photographing. In order to change the focus in the conventional camera, re-photographing was necessary, but in the present example, only one photographing is required.

A fast Fourier transform has been described as an example of a method of calculating a spatial frequency spectrum from the moiré fringes, but is not limited thereto, and it can also be realized also by using a discrete cosine transform (DCT) or the like and furthermore, it is also possible to reduce the amount of computation.

The grating patterns 104 and 105 are described as Fresnel zone plates and Gabor zone plates in the present embodiment, but is not limited thereto, and as long as the spatial frequency spectrum can be calculated from the moiré fringes, a pattern in the one-dimensional direction of another example or the like may be used. These can also be applied to other examples.

Example 2

The present example is different from Example 1 in that the focus adjustment can be automated. The configuration of the present example is illustrated in FIG. 24. The difference from FIG. 22 of Example 1 is a focus position calculation unit 2401.

FIG. 25 is a flowchart illustrating an outline of autofocus by the focus position calculation unit 2401 of FIG. 24. This autofocus is realized by performing reconstruction process while shifting the focus position by resolution $\Delta f$ and calculating the position where the contrast becomes maximum. This processing will be described in detail.

First, an initial value (at infinity or distance 0, and the like) of the focus position is set (S2501), the enlargement ratio $\alpha$ is calculated from the focus position, and the coefficient β of the second grating pattern 105 is calculated (S2301). S2101 to S503 are the same as those in FIG. 23 and thereafter, as illustrated in FIG. 26, any region 2601a in a region 2601 within an imaging range is cut out (S2503). This region is used for focus adjustment, and may be set by the user using the GUI, or automatically set by a facial recognition technology or the like. Next, contrast in the region 2601a is calculated by Expression 18 and Expression 19 using the maximum luminance Imax and the minimum luminance Imin in the region (S2504) and stores the result in the memory (S2505).

$$C = \frac{I_{max} - I_{min}}{I_{max} + I_{min}} \quad \text{[Expression 18]}$$

$$C = \frac{I_{max}}{I_{min}} \quad \text{[Expression 19]}$$

Thereafter, the focus position is deviated by Δf (S2502), and subsequent processing from S2502 to S2505 is performed until scanning within a focus variable range which is set in advance is completed (S2506). When contrast information in the memory is read after searching is completed, a relationship between the contrast and the focus position is obtained as illustrated in FIG. 27 (S2507) and thus, the focus position at which the contrast becomes the maximum is searched (S2508) and is output (S2509).

If image processing is performed in the image processing unit 2202 based on the focus position information obtained by the focus position calculation unit 2401, photographing with optimum focus can be performed.

According to the method and the configuration described above, it is possible to automate focus adjustment, and unlike the conventional camera, photographing with the optimum focus can be performed without performing re-photographing.

Searching for the maximum contrast is performed in the present example, but is not limited thereto, any method may be available as long as it is possible to determine a focus position at which it becomes a clear image, such as a signal to noise ratio (SNR) or an added value of a high-pass filter (HPF).

A scanning range of the focus position can be set in advance by the user.

A method of shifting the focus position by Δf has been described, but is not limited thereto. As blurring of an image due to change in the focus position becomes lower in sensitivity to the position as it goes farther away, it is possible to perform searching with higher precision and higher speed by shifting the vicinity of the imaging device 101 finely and a distant portion thereof coarsely.

These can also be applied to other examples.

Example 3

The present example is different from Example 1 in that distance information in two-dimensional directions (horizontal and vertical directions) as well as images can be acquired. The configuration of present example is illustrated in FIG. 28. The difference from FIG. 22 of Example 1 is a ranging unit 2801 and a distance information display unit 2802.

FIG. 29 is a flowchart illustrating an outline of ranging by the ranging unit 2801 of FIG. 28. This ranging is realized by measuring the optimum focus position (=position where an object exists) by implementing the principle of autofocus according to Example 2 for each region. This processing will be described in detail.

First, S2501 to S503 are the same as those of FIG. 25 in Example 2. Thereafter, as illustrated in FIG. 30, the region 2601 within the imaging range is divided (S2901). Since this division size corresponds to resolution in the two-dimensional direction in the ranging, it is preferable that the size be fine, but there is a problem that a measurement error increases if it is too fine. Accordingly, it is also useful that the user can change the division size according to environment. Regions 3001a and 3001b are illustrated in FIG. 30 as examples of the divided region 3001. Next, for each region, the contrast in the region is calculated by Expression 18 and Expression 19 using the maximum luminance Imax and the minimum luminance Imin in the region (S2902) and stores the result in the memory (S2903).

$$C = \frac{I_{max} - I_{min}}{I_{max} + I_{min}} \quad \text{[Expression 18]}$$

$$C = \frac{I_{max}}{I_{min}} \quad \text{[Expression 19]}$$

Thereafter, the focus position is deviated by Δf (S2502), and subsequent processing from S2502 to S2903 is performed until scanning within a focus variable range which is set in advance is completed (S2904). When contrast information in the memory is read after searching is completed, the relationship between the contrast and the focus position is obtained as illustrated in FIG. 31 (S2905). As in this example, it can be seen that the region 3001a in which a distant mountain is included in the region has the maximum contrast in the distance and the region 3001b in which a nearby person is included in the region has the maximum contrast in the relatively nearby. In the example, only the change of the two regions is illustrated in FIG. 31, but actually, it is stored in the memory by the number of divisions of the region 3001 in FIG. 30. As such, a focus position at which the contrast becomes maximum is searched for each region (S2906), and a two-dimensional map of distance information is created and output (S2907).

Distance information in the two-dimensional direction can be confirmed by displaying this distance information by the distance information display unit 2802. Here, the distance information display unit 2802 is used, but it can also be applied to obstacle recognition and automatic driving in devices such as automobiles and drones, by using the output of the distance measuring unit 2801 directly, According to the method and the configuration described above, it is possible to acquire not only the image but also the distance information in the two-dimensional direction (horizontal and vertical directions).

Searching for the maximum contrast is performed in the present example, but is not limited thereto, and any method may be available as long as it is possible to determine a focus position at which it becomes a clear image, such as a signal to noise ratio (SNR) or an added value of a high-pass filter (HPF).

In a case where two-dimensional ranging is unnecessary, as illustrated in FIG. 32, it is also possible to divide the region 2601 within the imaging range in the lateral direction and measure the distance in units of the divided regions 3001. With this, only ranging in the horizontal direction can be performed, but the SNR of distance information can be improved by using information in the longitudinal direction.

Of course, it is also possible to measure the distance only in the vertical direction by dividing the region 2601 within the imaging range in the vertical direction.

Although the example of calculating distance information from a single frame has been described in the present example, it is also possible to improve the SNR by averaging and using the images of a plurality of frames or averaging and using the distance information of the plurality of frames, improve distance accuracy, and improve resolution in the two-dimensional direction.

It is also possible to calculate speed information in the two-dimensional direction or the one-dimensional direction by obtaining a difference in the distance information between the frames.

These can also be applied to other examples.

Example 4

In Example 3, also when ranging in the one-dimensional direction is performed as in the example of FIG. 32, the two-dimensional image sensor 103 is used as illustrated in FIG. 28 and thus, it is necessary to perform S501 in FIG. 29 by two-dimensional FFT, which increases calculation cost and image sensor cost.

Accordingly, in the present example, a configuration specialized for ranging in the one-dimensional direction will be described. The configuration of the present example may be the same as that of FIG. 28 in Example 3, but the first grating 104 of the modulator 1901 is set as a one-dimensional pattern as illustrated in FIG. 33. In the plurality of straight lines in this pattern, the distances between straight lines are narrowed in inverse proportion to the reference coordinates. This pattern can be defined by Expression 20.

$$I(r) = \frac{1}{2}(1 + \cos\beta x^2) \qquad [\text{Expression 20}]$$

As such, it is possible to detect only in the horizontal direction by using a grating pattern in which identical patterns are continuous in the vertical direction.

An example using this grating pattern is illustrated in FIG. 34. It is constituted with a modulator 3401 and a line sensor 3402. Transmittance of the surface of the modulator 3401 is modulated by a grating pattern 3403 based on Expression 20. According to the present configuration, it is possible to suppress sensor cost by using a one-dimensional line sensor and greatly reduce the amount of calculation by using one-dimensional Fourier transform as Fourier transform. In this example, a configuration in which the grating pattern on the sensor side (back surface) is omitted is illustrated, but of course, it may be realized with a configuration with grating pattern on the back surface, which is the same in all discussions.

Another example is illustrated in FIG. 35. It is constituted with a cylindrical lens 3501, a modulator 3502, and a line sensor 3402. Transmittance of the surface of the modulator 3502 is modulated by the grating pattern 3503 based on Expression 20. Furthermore, the cylindrical lens 3501 is disposed so that the focal position of the cylindrical lens 3501 is on the line sensor 3402. According to the present configuration, it is possible to detect by using more light beams than in FIG. 34 and thus, it is possible to improve the SNR of distance information.

Still another example is illustrated in FIG. 36. It is constituted with a modulator 3502, the image sensor 103, and a vertical direction addition unit 3601. In the vertical direction addition unit 3601, computation of adding luminance in the vertical direction of the image sensor 103 is performed. According to the present configuration, even if the cylindrical lens 3501 is not used as illustrated in FIG. 35, detection can be performed using more light beams and thus, it is possible to improve the SNR of distance information.

Although the example in which the pattern in the one-dimensional direction of FIG. 33 is used for ranging has been described in the present example, by using the pattern as the grating patterns 104 and 105 of other embodiments, it is possible to perform processing such as photographing, refocusing, and autofocusing limited to the one-dimensional direction and it is possible to greatly reduce the amount of calculation required for the frequency spectrum.

Also, in the examples as described, the configuration specialized for ranging in the horizontal direction has been described, but is not limited thereto, and it is also possible to perform detection only in the vertical direction or to detection in any angular direction, by using a grating pattern, in which identical patterns are continuous in the horizontal direction as the grating pattern illustrated in FIG. 33, like Expression 21.

$$I(r) = \frac{1}{2}(1 + \cos\beta y^2) \qquad [\text{Expression 21}]$$

These can also be applied to other examples.

Example 5

In the examples as described above, there is a possibility that the size of the imaging device 101 may increase due to computation of the image processing unit 2002, the ranging unit 2801, and the like. Therefore, in the present example, a processing division method for reducing the size of the imaging device 101 will be described.

FIG. 37 illustrates a configuration of the present example. Unlike FIG. 28 of Example 3, the modulator 1901 and the image sensor 103 are mainly included in the imaging device 101, and the image storing unit 2201, the image processing unit 2202, and the ranging unit 2801 are included in a signal processing unit 3701.

In the present configuration, if the output of the imaging device 101 is connected to the Internet via a wired or wireless local area network (LAN), the signal processing unit 3701 may be performed by a server or the like, and there is no limitation on the size of the imaging device 101.

However, in the configuration of FIG. 37, it is considered that data capacity of the output of the image sensor 103 is large, which is problematic. Therefore, a method of compressing an image in a case where the focus position is decided as in Example 2 will be described with reference to FIG. 38.

Unlike FIG. 22 of Example 2, in FIG. 38, the modulator 1901, the image sensor 103, an image compression unit 3801, and the focus setting unit 2203 are mainly included in the imaging device 101, and the image processing unit 106 is included in a signal processing unit 3802.

FIG. 39 is a flowchart illustrating an outline of image compression by the image compression unit 3801 in FIG. 38. Based on focus distance information which is output from the focus setting unit 2203, the enlargement ratio α is calculated from Expression 17 and computation with the coefficient β of the second grating pattern 105 on the back surface side as β/α is performed (S3901). Thereafter, based on the coefficient, a moiré fringe image corresponding to transmission through the grating pattern on the back surface side is generated (S3902). Here, since the pitch of the pixels 103a of the image sensor 103 is small enough to sufficiently reproduce the pitch of the first grating pattern 104, data capacity is increased. Therefore, after applying a low-pass filter (LPF), which allows the spatial frequency to pass through, enough to resolve the moiré image (S3903), downsampling is performed (S3904) and the data capacity is compressed. If the sampling frequency at the time of downsampling is more than twice the LPF pass bandwidth, it is desirable because it is possible to recover the original signal, but is not limited thereto.

The present invention is not limited to the examples described above, but includes various modified examples. For example, the examples described above have been described in detail in order to explain the present invention in an easy-to-understand manner, and are not necessarily limited to those having all the configurations described.

Further, a portion of the configuration of a certain example can be replaced by the configuration of another example, and the configuration of another example can be added to the configuration of a certain example.

Further, it is possible to add, delete, and replace other configurations for a portion of the configuration of each example.

Each of the configurations, functions, processing units, processing means, and the like described above may be realized in hardware by designing a portion or all of them, for example, with an integrated circuit. Each of configurations, functions, and the like described above may be realized by software by allowing a processor to interpret and execute a program which realizes each function. Information such as a program, a table, a file or the like that realizes each function can be stored in a recording device such as a memory, a hard disk, a solid state drive (SSD), or a recording medium such as an IC card, an SD card, or a DVD.

Also, control lines and information lines indicate what is considered to be necessary for explanation, and all control lines and information lines are not necessarily indicated for products. In practice, it can be considered that almost all the configurations are mutually connected.

REFERENCE SIGNS LIST

101: imaging device
102: modulator
102a: grating substrate
102b: support member
103: image sensor
103a: pixel
106: image processing unit
107: image display unit
104: grating pattern (front side)
105: grating pattern (back side)
401: subject
1201: grating sensor integrated substrate
1401: point
1402: shadow
1601: point
1602: shadow
1901: modulator
1902: image processing unit
1903: intensity modulation unit
2201: image storing unit
2202: image processing unit
2203: focus setting unit
2401: focus position calculation unit
2601: region
2601a: region
2801: ranging unit
2802: distance information display unit
3001: region
3001a: region
3001b: region
3201: region
3401: modulator
3402: line sensor
3403: grating pattern
3501: cylindrical lens
3502: modulator
3503: grating pattern
3601: vertical direction addition unit
3701: signal processing unit
3801: image compression unit
3802: signal processing unit

The invention claimed is:

1. An imaging device comprising:
an image sensor that converts an optical image captured by a plurality of pixels arranged in an array on an imaging surface into an image signal and outputs the image signal;
a modulator that is provided on a light receiving surface of the image sensor and modulates light intensity;
an image storing unit that temporarily stores the image signal output from the image sensor; and
a signal processing unit that performs image processing of the image signal output from the image storing unit, wherein
the modulator has a first grating pattern composed of a plurality of concentric circles, and
the signal processing unit modulates the image signal output from the image storing unit with a virtual second grating pattern composed of a plurality of concentric circles so as to generate a moiré fringe image and changes a size of the concentric circle of the second grating pattern according to a focus position; and
a focus position calculation unit that estimates an appropriate focus position, wherein
the focus position calculation unit calculates an evaluation index of an image obtained based on the moiré hinge image while changing the focus position and estimates the appropriate focus position by detecting a peak of the evaluation index.

2. The imaging device according to claim 1, wherein the signal processing unit calculates the evaluation index of the image obtained based on the moiré fringe image for each divided region within an imaging range while changing the focus position and detects the peak of the evaluation index for each of the regions, thereby estimating a distance from the image sensor to a subject for each of the regions.

3. The imaging device according to claim 2,
wherein the each divided region is divided only in the horizontal direction of a photographing range.

4. The imaging device according to claim 2,
wherein the each divided region is divided only in the vertical direction of a photographing range.

5. The imaging device according to claim 1,
wherein the plurality of concentric circles in the first grating pattern and the second grating pattern are formed such that a pitches of the concentric circles become smaller in inverse proportion to reference coordinates which is a center of the concentric circles.

6. The imaging device according to claim 1, wherein the signal processing unit calculates a frequency spectrum by performing two-dimensional Fast Fourier Transform on the generated moiré fringe image.

7. An imaging device comprising:
an image sensor that converts an optical image captured by a plurality of pixels arranged in an array on an imaging surface into an image signal and outputs the image signal;
a modulator that is provided on a light receiving surface of the image sensor and modulates light intensity;
an image storing unit that temporarily stores the image signal output from the image sensor; and
a signal processing unit that performs image processing of the image signal output from the image storing unit,
wherein the modulator has a first grating pattern composed of a plurality of straight lines,
the signal processing unit modulates the image signal output from the image storing unit with a virtual second grating pattern composed of a plurality of straight lines so as to generate a moiré fringe image, and
the signal processing unit changes a distance between straight lines of the second grating pattern according to a focus position.

8. The imaging device according to claim 7, further comprising:
a focus position calculation unit that estimates an appropriate focus position,
wherein the focus position calculation unit calculates an evaluation index of an image obtained based on the moiré fringe image while changing the focus position and estimates the appropriate focus position by detecting a peak of the evaluation index.

9. The imaging device according to claim 8, further comprising:
a ranging unit that estimates a distance from the image sensor to a subject, wherein the ranging unit calculates the evaluation index of the image obtained based on the moiré fringe image for each divided region within an imaging range while changing the focus position and detects the peak of the evaluation index for each of the plurality of regions, thereby estimating the distance from the image sensor to the subject for each of the plurality of regions.

10. The imaging device according to claim 7, wherein the plurality of straight lines in the first grating pattern and the second grating pattern are formed such that a distance between the straight lines becomes narrower in inverse proportion to reference coordinates.

11. The imaging device according to claim 7, wherein the signal processing unit calculates a frequency spectrum by performing one-dimensional Fourier transform on the generated moiré fringe image.

12. An imaging device comprising:
an image sensor that converts an optical image captured by a plurality of pixels arranged in an array on an imaging surface into an image signal and outputs the image signal;
a modulator that is provided on a light receiving surface of the image sensor and modulates light intensity; and
a signal processing unit that performs image processing of the image signal output from an image storing unit,
wherein the modulator has a first grating pattern and a second grating pattern composed of a plurality of straight lines,
the modulator performs intensity modulation on light transmitted through the first grating pattern with the second grating pattern so as to generate a moiré fringe image, and
wherein the plurality of straight lines in the first grating pattern and the second grating pattern are formed such that a distance between the straight lines becomes narrower in inverse proportion to reference coordinates.

13. The imaging device according to claim 12, wherein the signal processing unit calculates a frequency spectrum by performing one-dimensional Fourier transform on the image signal.

* * * * *